April 3, 1951        J. A. V. TURCK        2,547,063
KEY-DRIVEN CALCULATING MACHINE
Filed Sept. 12, 1946        9 Sheets-Sheet 1

Inventor
Joseph A. V. Turck
BY
Attorneys.

April 3, 1951 J. A. V. TURCK 2,547,063
KEY-DRIVEN CALCULATING MACHINE
Filed Sept. 12, 1946 9 Sheets-Sheet 2

Inventor
Joseph A.V. Turck
BY
Carlson, Pitzner, Hatton & Woff
Attorneys.

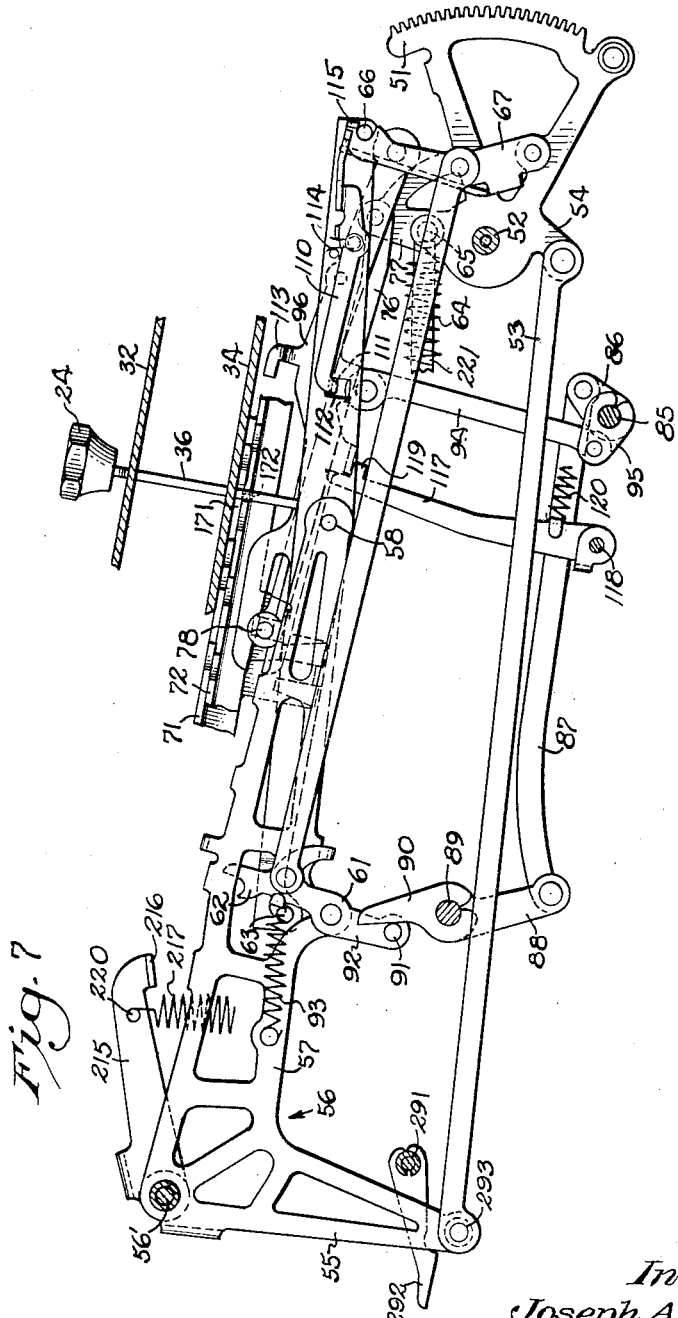

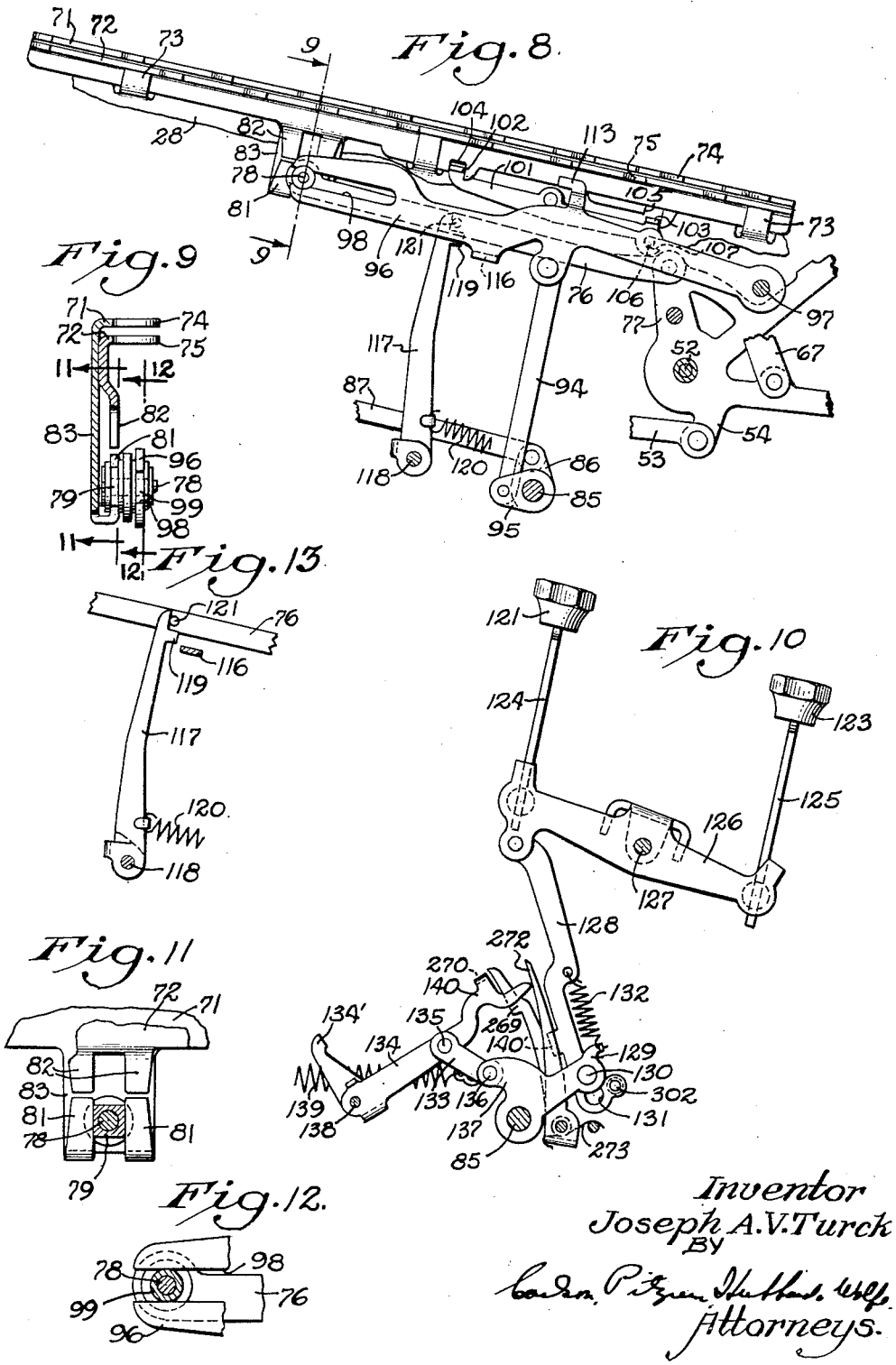

April 3, 1951      J. A. V. TURCK      2,547,063
KEY-DRIVEN CALCULATING MACHINE
Filed Sept. 12, 1946      9 Sheets-Sheet 9
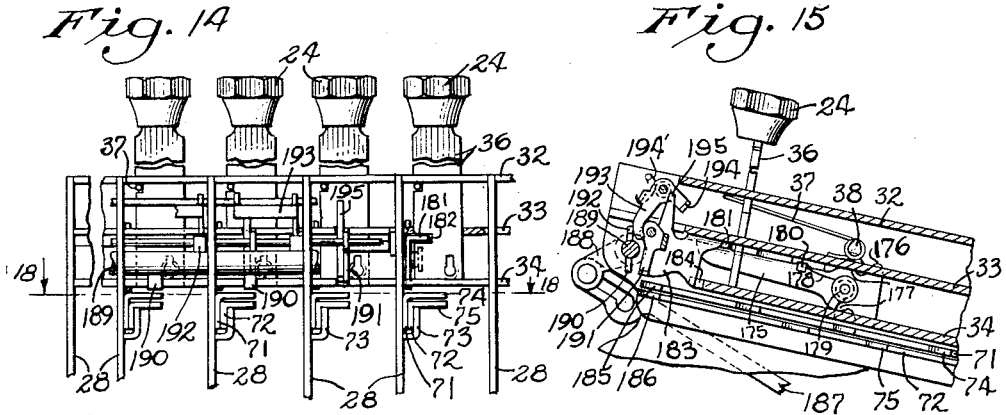
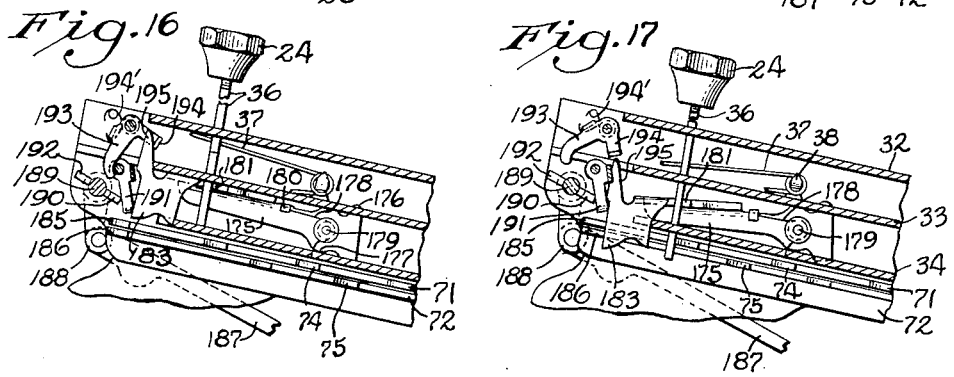
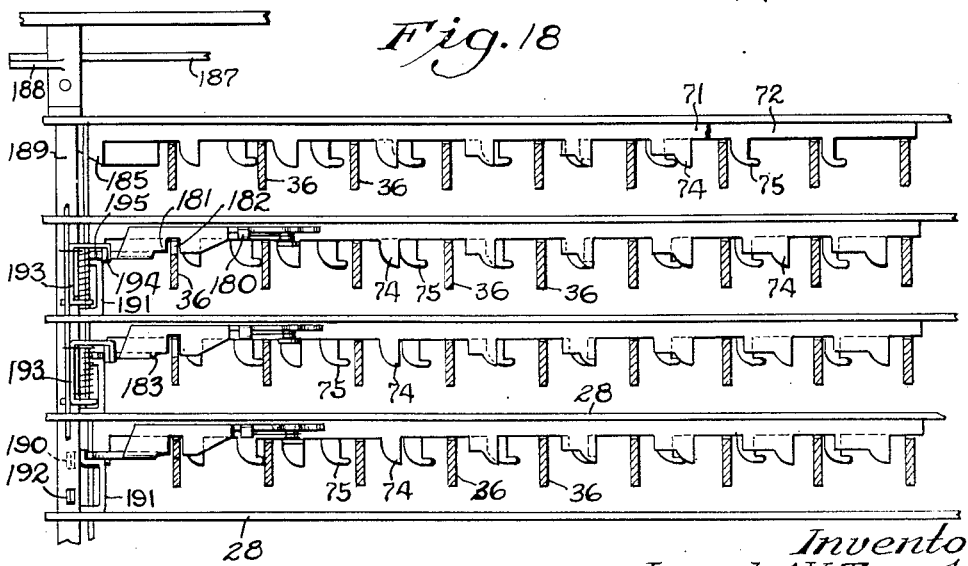
Inventor
Joseph A. V. Turck
By
Attorneys Patented Apr. 3, 1951

2,547,063

UNITED STATES PATENT OFFICE 2,547,063

KEY-DRIVEN CALCULATING MACHINE

Joseph A. V. Turck, Wilmette, Ill., assignor to Felt & Tarrant Manufacturing Company, Chicago, Ill., a corporation of Illinois Application September 12, 1946, Serial No. 696,517

42 Claims. (Cl. 235—82)

The invention relates to improvements in calculating machines and, more particularly, to the improvements in the key-driven type where additive actuation is created by the down key depression in setting up power in springs to give additive degrees of action on the up or return stroke of the actuating mechanism.

The principal object of the present invention is the provision of dual leverage action for each denominational order which may be set to give varying degrees of movement under action from the same key and to all the keys of each denominational order, according to whether they are to be used for negative or positive calculation. The purpose of the dual leverage is to provide an actuating mechanism for a key-driven calculator operated by a uni-marked keyboard, that is, a keyboard in which all keys, except the "9" keys, bear a single number, to save the operator the trouble of learning the use of the dual marking. Familiarity with, in effect, two keyboards has been necessary in all key-driven calculating machines prior to the invention herein disclosed because of the dual complementary markings of each key. The touch system has always been complicated by the necessity of learning the touch of the dual marked keys on key-driven calculators and thus it is difficult to become adept in negative forms of calculation on account of the lack of continuity in formation of the key tops which serve in the positive forms of calculation only. The formation of the key tops with the use of the uni-marked keyboard of this invention provides a great advantage.

Another object of the invention is to provide mechanism by the means of which automatic subtraction may be accomplished on a key-driven calculator.

A third object of the invention is that of combining the scheme of the dual stop mechanism disclosed in the machine of my pending application Serial No. 494,907 of July 16, 1943, issued as Patent No. 2,527,467 on October 24, 1950, and a dual key-operated leverage action, and utilizing the means employed in the said application for bringing the stop actions into use, for jointly bringing into play the proper fulcrum to coact with each stop bar for positive forms of calculation, such as addition and multiplication, or for jointly bringing into play the fulcrum and the relative stop bar for negative forms of calculation, such as subtraction and division.

A fourth object of invention is present in the means employed when a subtraction is made to delay the adding action until power is stored in such remaining orders of the machine as have not already had power stored in them by key depression in setting up the subtrahend, whereupon the said power in all orders is released automatically at the completion of the universal storing action.

A fifth object of the invention is that of the provision of means to prevent interference by the operator in supplying the auxiliary universal power to all the orders from holding any of the orders against free return by their normal means.

A sixth object of the invention is to provide an arrangement whereby the means for selecting the proper stop bar and fulcrum, the means for delaying the adding action in a subtractive operation, and the means for preventing interference by the operator with the free return of the mechanisms of each of the orders, are brought under control of an indicative manual setting device. The manual setting device also serves to clear and reset locks normally holding the manual means for supplying the auxiliary power against use except when the machine is pre-set for subtracting.

Another object is to provide a key-driven calculating machine embodying means for selectively controlling the degree of actuation of the accumulator mechanism by the keys whereby the same value markings serve to identify the keys for either additive or subtractive operations, thus eliminating the dual key markings heretofore required and enabling the operator to perform either type of calculation by the simple touch system used for adding.

Another object is to provide means settable so that the complemental rather than the numerical values of depressed keys are transferred to the accumulator mechanism immediately upon release of the keys to facilitate the performance of division.

Other objects and advantages of the invention will become apparent from the following detailed description of the preferred embodiment illustrated in the accompanying drawings, in which:

Fig. 5a is a fragmentary view similar to Fig. 5 but showing the toggle mechanism in locked condition.

Fig. 7 is a view similar to Fig. 6 but showing the actuating mechanism set for a subtractive or negative operation.

Fig. 8 is a fragmentary front to rear vertical sectional view of the machine taken in substantially the same plane as Fig. 7 with certain parts omitted to more clearly show the stop bar selecting means.

Fig. 9 is a transverse sectional view of the stop bar selecting mechanism taken in a plane substantially on the line 9—9 of Fig. 8.

Fig. 10 is a detail view of the manually operable means for setting the machine for additive or subtractive operations.

Fig. 11 is a fragmentary sectional view taken in a plane substantially on the line 11—11 of Fig. 9.

Fig. 12 is a fragmentary sectional view taken in a plane substantially on the line 12—12 of Fig. 9.

Fig. 13 is a detail view of the locking element for the stop bar selector guide lever.

Fig. 14 is a fragmentary transverse sectional view of the machine taken in a plane substantially on the line 14—14 of Fig. 3.

Fig. 15 is a fragmentary sectional view of the "9" key control means taken in a vertical plane substantially on the line 15—15 of Fig. 1 showing the parts in their normal position when the machine is set for adding.

Fig. 16 is a sectional view similar to Fig. 15 but showing the parts set for a subtractive operation.

Fig. 17 is a sectional view similar to Fig. 16 showing the associated digital key depressed.

Fig. 18 is a fragmentary sectional view taken in a plane substantially on the line 18—18 of Fig. 14.

Figure 1:
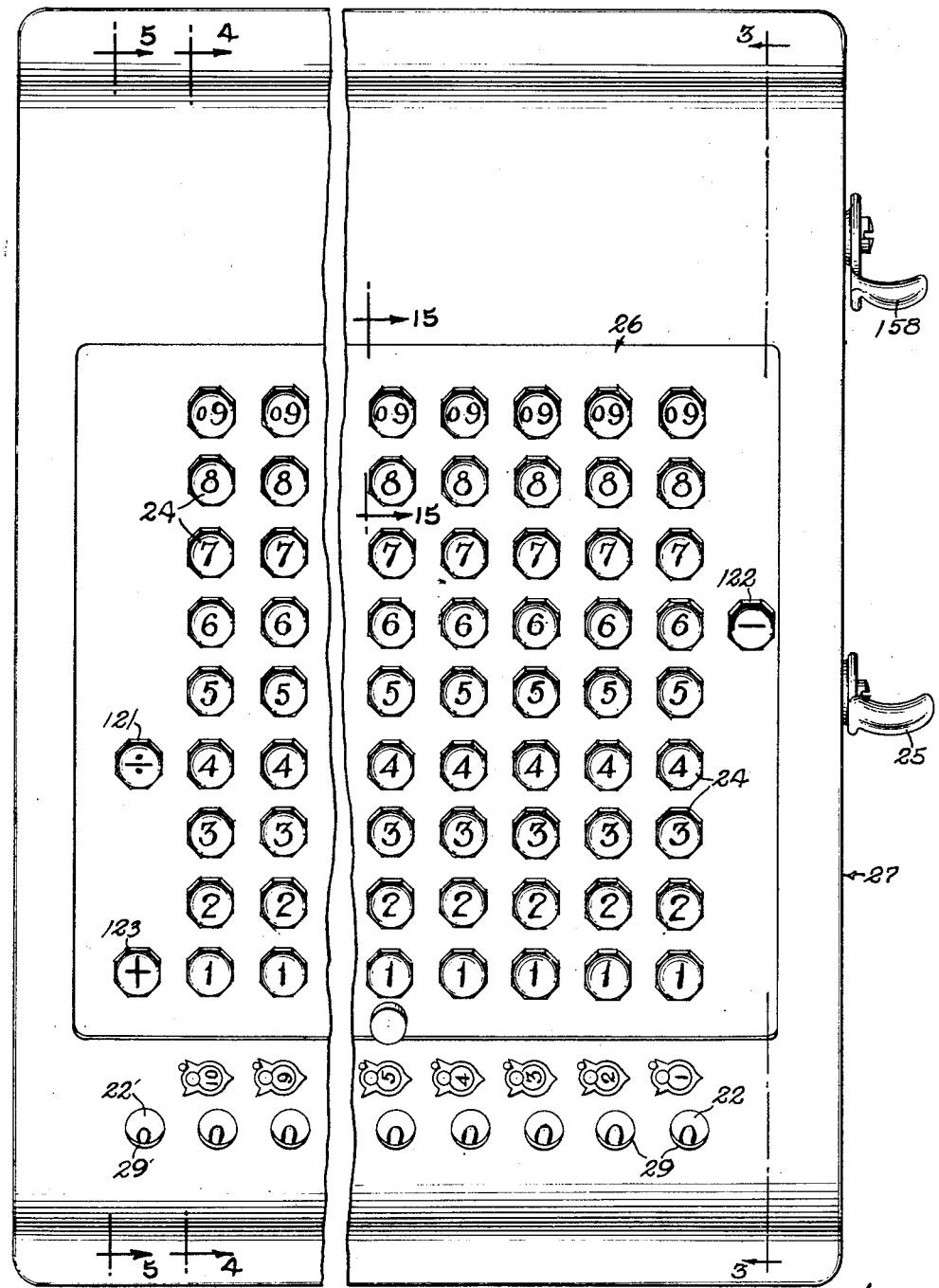
Figure 1 is a plan view of a key-driven calculating machine embodying the features of the invention.

While the invention is susceptible of various modifications and alternative constructions, I have shown in the drawings and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

General construction

The machine selected to illustrate the invention is equipped with an accumulator mechanism 21 (Fig. 5) of the general type disclosed in my prior Patent No. 1,357,748. The mechanism includes a register comprising a plurality of denominational numeral wheels 22 (Figs. 1, 3 and 5) each with its associated carrying mechanism for carrying over the tens from a lower denominational to a higher denominational numeral wheel. The accumulator mechanism is operated through novel actuating mechanism 23 (Figs. 4, 6 and 7) hereinafter described in detail, such operation being effected through the medium of digital keys 24. One column of keys is provided for each denominational order of the accumulator mechanism, there being nine of the keys 24 in each column numbered 1-9, beginning at the front of the machine with each "9" key carrying a small "o". As in prior calculating machines, the numeral wheels 22 and other elements of the accumulator mechanisms are mounted on a frame 24' supported to rock about the axis of the numeral wheel to engage and disengage the driving connection between the accumulator mechanisms and their associated actuating mechanisms. Zeroizing mechanism of the well known construction adapted for operation by means of a hand lever 25 (Figs. 1 and 2) is provided for swinging the frame 24' to the disengaged position in which the accumulator mechanism is cleared or "zeroized" in well known manner.

Figure 2:
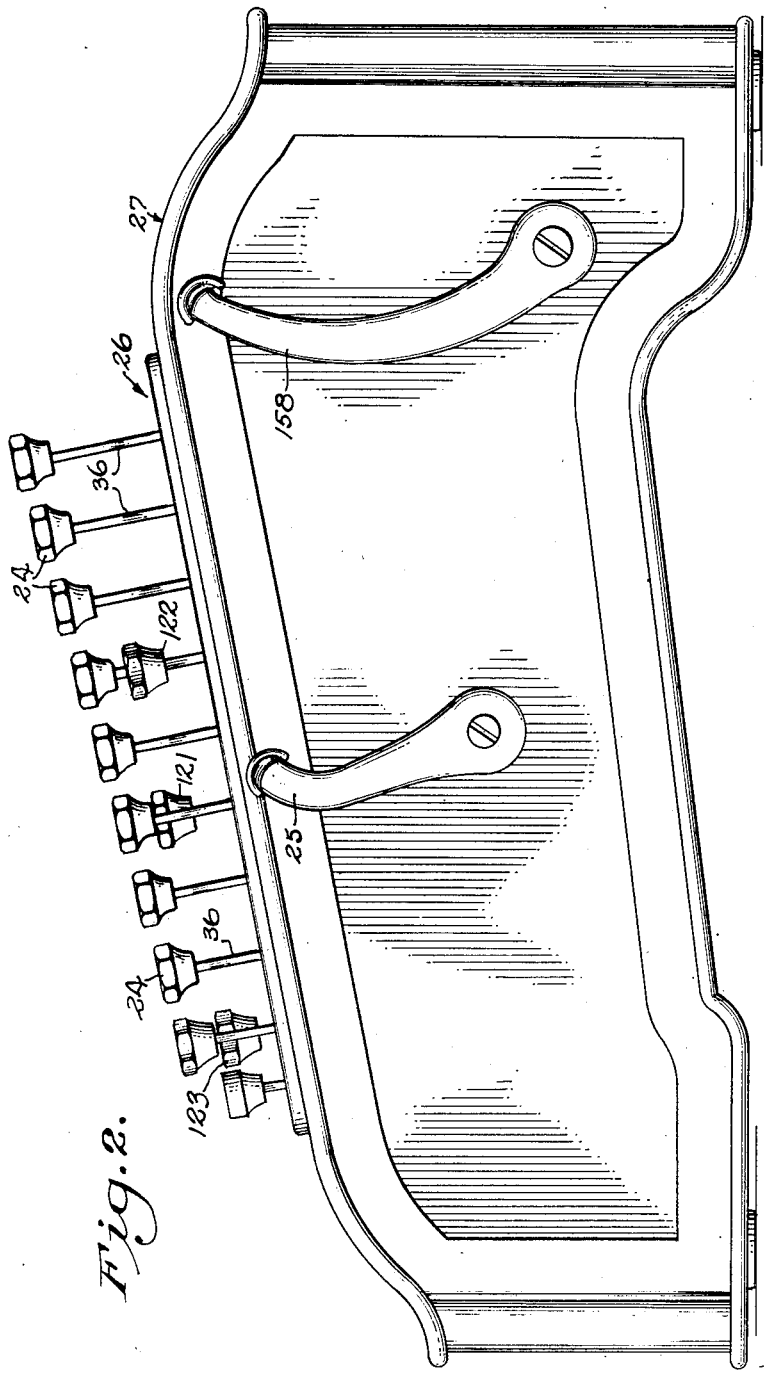
Fig. 2 is an elevational view of the machine as viewed from the right side.
Figure 3:
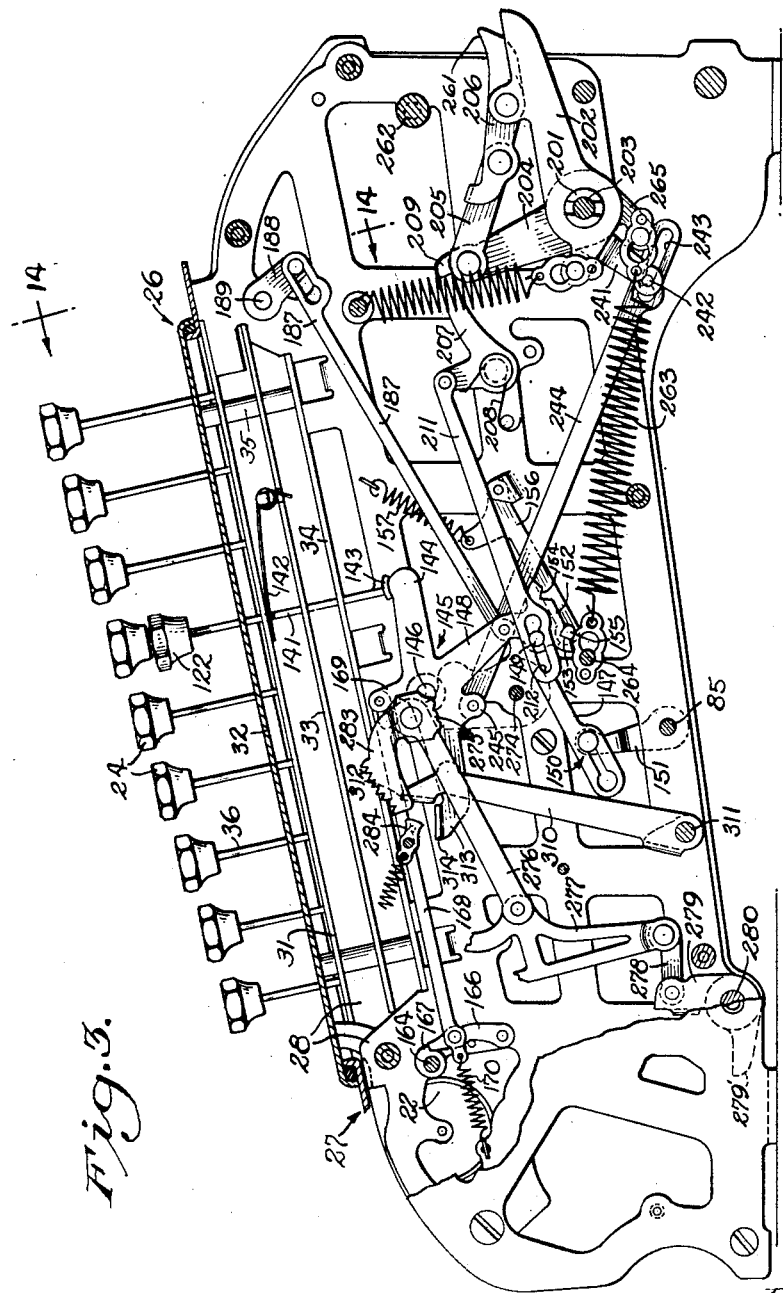
Fig. 3 is a front to rear vertical sectional view taken at the right-hand side of the machine in a plane substantially on the line 3—3 of Fig. 1.
Figure 4:
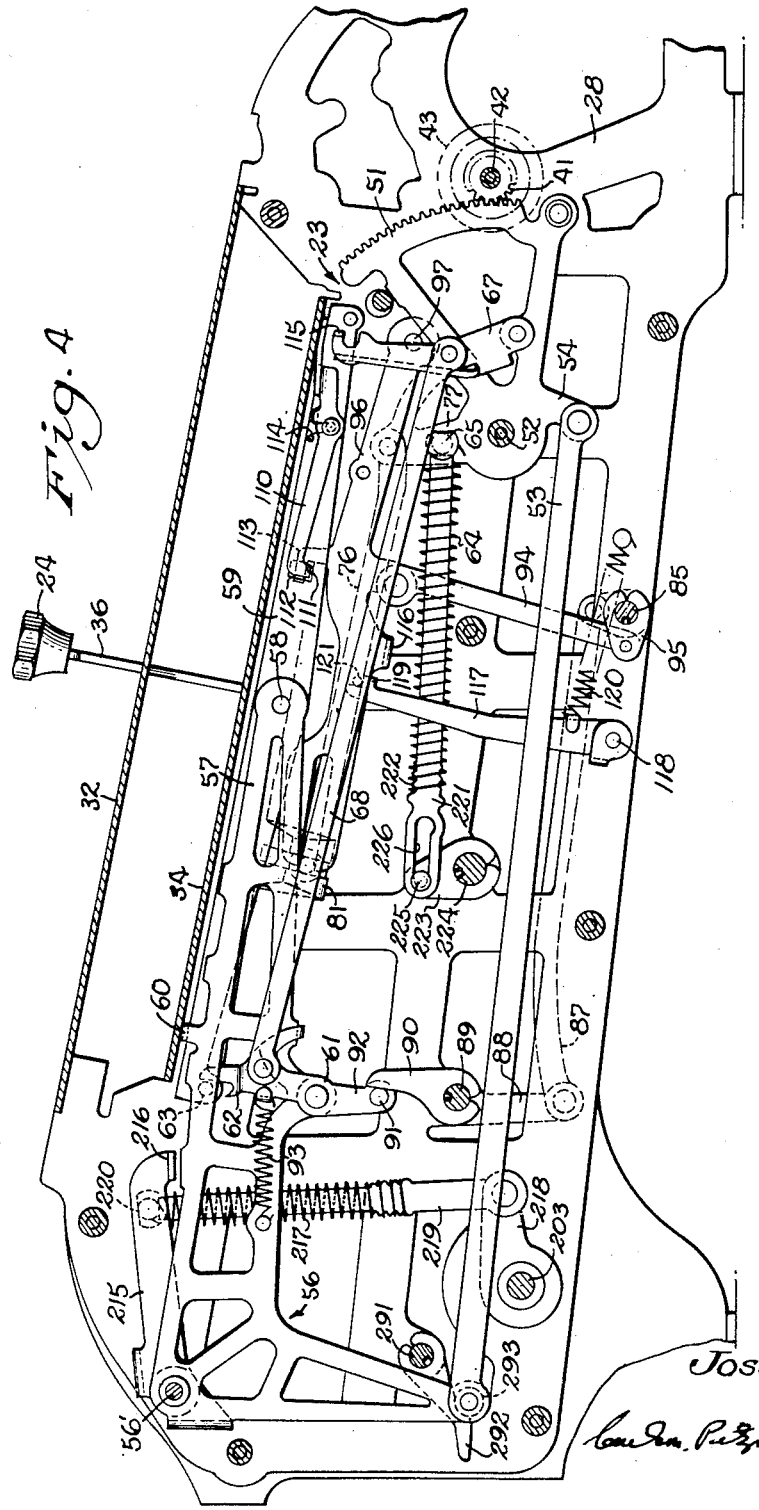
Fig. 4 is a front to rear sectional view at the left-hand side of the machine taken in a plane substantially on the line 4—4 of Fig. 1 showing details of the actuating mechanism for one of the ordinal columns of keys.
Figure 5:
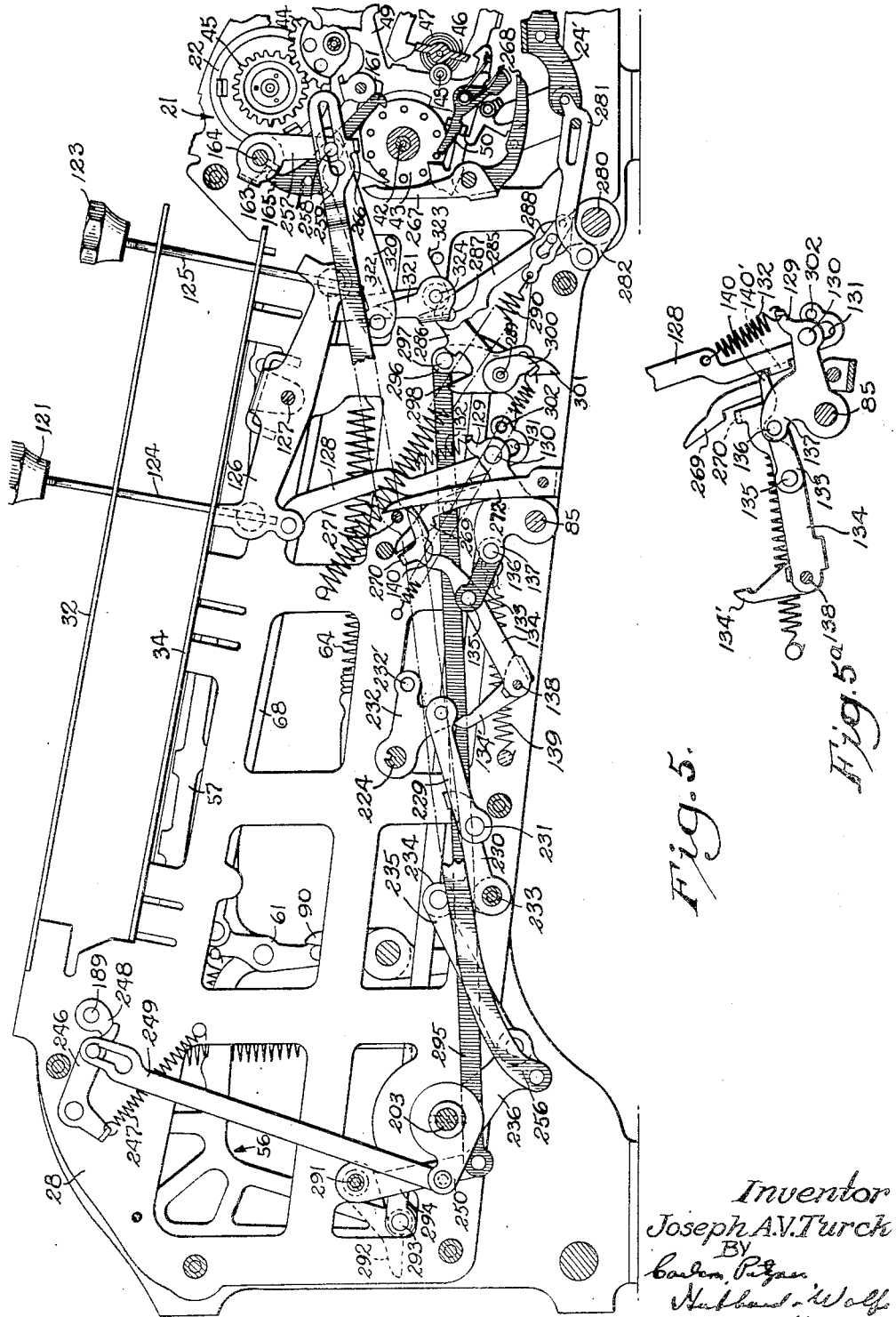
Fig. 5 is a front to rear sectional view taken at the left side of the machine in a plane substantially on the line 5—5 of Fig. 1.

In the exemplary machine the keys 24 are mounted in a key frame 26 forming the top wall of a casing 27 within which the various mechanisms are supported by skeleton frame members or partition plates 28 (Figs. 3–5). Windows 29 (Fig. 1) in the top of the casing adjacent the front end thereof expose the number wheels to view. As shown in Fig. 1 an additional window 29' is provided to the left of the window for the highest denominational numeral wheel to accommodate an overflow numeral wheel 22'.

As herein shown, the key frame 26 is formed of generally rectangular plates 31, 32, 33 and 34 (Figs. 3 and 14–17) suitably secured together and held in parallel spaced relation by posts 35. Each of the keys 24 is provided with an elongated flat stem 36 adapted to extend through alined slots in the frame plates for cooperation with the actuating mechanism 23. The keys are yieldably urged upwardly by individual springs 37 mounted on lugs 38 struck up from the plate 33 as shown in Figs. 14–17. The free ends of the springs engage in notches formed in the edges of the stems 36 so as to lie crosswise of the slots in the frame plates 32 and 33 and thus serve additionally to define the upper and lower limit positions of the keys.

Each key 24 when depressed serves to impart a predetermined degree of digital actuation to the accumulator mechanism as indicated by appropriate rotation of the numeral wheel 22 of the denominational order with which the depressed key is associated. Thus each row of keys is adapted to impart rotation to an accumulator actuating pinion 41 (Fig. 4) journaled on a cross shaft 42 that extends across the machine and is supported by the frame members 28. Rotation of the pinion 41 in one direction is transmitted through an internal ratchet mechanism to a combined lantern wheel and accumulator gear 43 (Figs. 4 and 5) also journaled on the shaft 42. The lantern wheel gear is arranged to drive the associated numeral wheel 22 through the medium of a carrying gear (not shown) an intermediate gear 44 (Fig. 5) and a pinion 45 rigid with the numeral wheel, the gears being carried by the rock frame 24'.

Carrying mechanism is provided in each denominational order of the accumulator mechanism for imparting a digital unit of actuation thereto each time that a tens transfer is to take place from a lower to a higher denominational order of the accumulator. This mechanism is shown and described in my prior Patent No. 1,357,748 to which reference may be had for a complete description of the construction and mode of operation. Briefly, the carrying mechanism includes a carrying cam member 46 (Fig.

5) which is given a 180° rotation by a suitable carrying motor spring 47 associated with the carrying gear of the next lower denominational order for each tens transfer that is to be effected. The carrying cam member 46 acts upon a dolly roll 48 secured to a bell crank carrying-lever 49 to rock the latter in a clockwise direction as viewed in Fig. 5. Such rocking of the carrying lever 49 operates through a carrying pawl 50 pivotally mounted on the lever to throw the lantern wheel 43 a sufficient distance to impart through the train of gears a digital unit of actuation to the numeral wheel 22.

*Actuating mechanism*

In carrying out the invention, the actuating mechanisms 23 by which the movements of the keys 24 are transmitted to the accumulator mechanisms are constructed and arranged so that the operation of each key may be registered either as a positive value for use in addition or multiplication or a negative value for use in subtraction or division. More specifically, the actuating mechanisms are so constructed and arranged that they may be selectively set to transmit to the associated numeral wheel of the accumulator mechanism upon depression of a key a degree of movement effective to register either the numerical value of the key or the complement of that value. Thus in each ordinal column of keys, except the first, the actuating mechanism may be set so that the depression of the "1" key will register either 1 or 8. The "2" key either 2 or 7, etc. In the first ordinal column of keys the selective setting of the actuating mechanism automatically conditions the "1" to register either 1 or 9. The "2" either 2 or 8, etc. Since negative values may be registered for subtraction or division by depressing the same keys used for registering positive values for addition, the keys may be designated by a single numeral. The uni-marked keyboard thus provided materially simplifies the performance of negative calculations such as subtraction or division and enables such calculations to be performed by the same simple touch system used for adding and multiplication.

Figure 6:
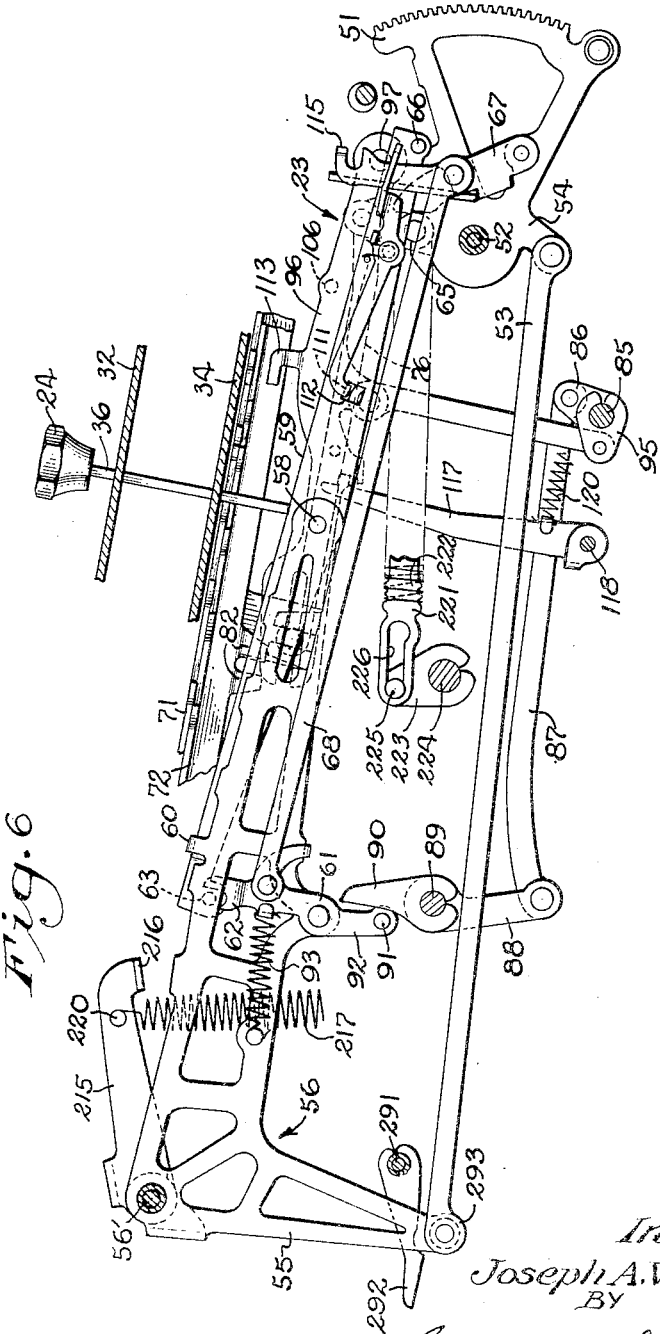
Fig. 6 is a side view of the ordinal actuating mechanism as viewed from the left-hand side showing the mechanism set for an additive or positive operation.

As the actuating mechanisms 23 for the several denominational orders of the accumulator are alike, a description of one will suffice. Referring to Figs. 4, 6 and 7 of the drawings, the actuating mechanism provided for each denominational order comprises a prime actuator in the form of a gear sector 51 pivotally supported on a shaft 52 extending across the machine adjacent the front end thereof. The gear teeth of the sector mesh with the teeth of the actuating pinion 41 of the accumulator mechanism which, as explained heretofore, is coupled with the lantern wheel 43 through the medium of a pawl and ratchet mechanism. A link 53 secured at one end to a depending arm 54 rigid with the sector 51 connects the sector with the depending arm 55 of a bell crank 56 pivotally supported by a rod 56' extending across the machine and supported in the frame plates 28. The other arm 57 of the bell crank lever 59 projects forwardly below the key frame 26 to a point substantially in alinement with the "5" key of the ordinal column of keys with which it is associated.

Pivotally supported at 58 adjacent the forward end of the lever arm 57 is a balanced lever 59 extending longitudinally of the ordinal row of keys 24 and positioned for engagement by the lower ends of the key stems 36 upon depression of the keys. Rocking of the lever 59 relative to the arm 57 in a clockwise direction (as viewed in Fig. 4) is limited by a lug 60 projecting laterally from the upper edge of the arm to overlie the rear end of the lever. Provision is made for selectively limiting the relative rocking movement of the lever in the opposite direction, such means including a locking dog 61 pivotally mounted on the arm 57 so that its notched upper end 62 may be swung under a pin 63 projecting laterally from the lever adjacent its rear end. With the dog thus set for engagement with the pin 63 the lever 59 constitutes in effect an extension of the arm 57 so that the keys "1" and "9" when depressed impart a progressively increasing degree of movement to the bell crank lever 56. As shown in Fig. 4 the upper end of the notched dog 61 is spaced from the pin 63 so as to permit a small downward movement of the rear end of the lever 59, thus slightly increasing the range of movement of the keys "6" to "9" as compared with the movements of the lower numbered keys which engage the lever 59 forwardly of its pivotal point 58. This small variation in the degree of key movement has been found advantageous in practice.

The motion thus imparted to the bell crank 56 is transmitted through the link 53 to the sector 51 rocking the latter downwardly or in a clockwise direction as viewed in Fig. 4. The pinion 41 with which the sector gear meshes is correspondingly rotated but no rotation is imparted to the lantern wheel 43 because of the ratchet connection provided between the pinion and the wheel. Upon return movement of the sector the pinion and lantern wheel are rotated an amount determined by the displacement of the sector, thus registering on the numeral wheel 22 the value of the key depressed. Return of the sector is effected by a spring 64 anchored at one end to a stationary part of the machine and at the other end to a stud 65 rigid with the sector. Thus actual operation of the accumulator mechanism is effected uniformly irrespective of the manner in which the keys are manipulated, since the operation is effected through the medium of the power stored up in the spring 64 incident to the depression of the keys and takes place upon the release of the keys.

To permit registration of complemental values for negative calculations such as subtraction and division provision is made for changing the leverage ratio of the lever system through which the movements of the keys are transmitted to the accumulator mechanism. More specifically, provision is made for shifting the fulcrum of the lever 59 so as to substantially reverse the extent of movement imparted to the lever system and sector 51 by the respective keys. For this purpose the lever is provided at its forward end with a fulcrum stud 66, and a latch link 67 is pivotally supported on the sector 51 so that it may be hooked over the stud or disengaged therefrom as required. A link 68 connects the latch link 67 with the locking dog 61 so that when one of these fulcrum elements is shifted to its active position the other is simultaneously shifted to its inactive position.

With the latch link 67 hooked over the stud 66 the locking dog 61 is consequently rocked forwardly out of the path of the pin 63 at the opposite end of the lever 59. Depression of a key 24 accordingly rocks the lever about the axis of the stud 66 and the lever, through its pivotal connection 58 with the bell crank 56, rocks the latter about its pivot as shown in Fig. 7. The action in this instance is substantially the reverse of that obtained when the locking dog 61 is engaged since the "1" key imparts maximum displacement to the linkage while the "9" imparts minimum displacement thereto. As indicated above, the leverage ratios are such that the complemental values of the keys are registered on the number wheels 22.

*Digital control*

To insure accurate registration of the numerical values represented by the several keys 24 of each ordinal column, means is provided for positively controlling the degree of actuation of the sector gear 51 upon depression of any key. This means as herein shown is generally similar to that utilized heretofore in power driven calculating machines as disclosed in my copending application Serial No. 494,907, filed July 16, 1943, and comprises a pair of stop bars 71 and 72 (Figs. 6–9, 14 and 18) adapted to be coupled selectively with the gear sector 51 for positive and negative calculations respectively.

As shown in Figs. 8 and 18 the stop bars 71 and 72 comprise elongated sheet metal strips of angular cross section supported below and at one side of the column of keys with one flange disposed substantially parallel to the key frame 26 and the other flange disposed in a vertical plane. In the exemplary embodiment the bar 72 is located below and within the angle formed by the bar 71 and both are supported for endwise sliding movement by lugs 73 struck out from the frame members 28 (Figs. 8 and 14).

Formed on the upper flange of each of the stop bars 71 and 72 are a series of lugs 74 and 75 projecting laterally for engagement with the stems 35 of the keys 24 when the latter are depressed so as to limit the forward movement of the bars. The lugs 74 of the stop bar 71 are spaced apart as shown in Fig. 18 so that the movement of the bar increases progressively for the keys 1–9, the degree of movement in each instance being such that the numerical value of each key is registered accurately on the associated numeral wheel 22. The lugs 75 of the stop bar 72 are correspondingly spaced apart, but the relative location of the lugs is such that the complements of the numerical values of the keys are registered on the associated numeral wheels 22. Thus the lugs 75 are so positioned in all orders except the units order to permit key movement to add 8 on the depression of a "1" key, 7 on depression of a "2" key, etc. In the units order, the lugs are so positioned as to permit key movement to add 1 on depression of the "9" key, 2 on depression of an "8" key, etc.

To enable the stop bars to perform their control functions, provision is made for coupling the bars selectively with the gear sector 51 for movement therewith. Such selective coupling is effected through the medium of a link 76 (Figs. 8 and 9) pivotally connected at one end to an arm 77 rigid with the sector 51 and having at its other end a laterally projecting stud 78 carrying a generally rectangular collar 79 (Figs. 9 and 11). The collar 79 is adapted to fit snugly between a pair of spaced fingers 81 (Fig. 11) rigid with the stop bar 71 or, alternatively between a pair of spaced fingers 82 rigid with the stop bar 72. The latter fingers are formed on and project downwardly from the vertical flange of the stop bar 72 in laterally offset relation as shown in Fig. 9 while the fingers 81 are bent up from the lower edge of a tab 83 integral with and depending from the vertical flange of the stop bar 71. Thus the fingers 81 and 82 are disposed in a common plane and, as they are located so as to be in alinement when the stop bars are in their normal positions, the collar 71 may be shifted vertically into engagement with either set of fingers to effectually couple the associated stop bar to the gear sector 51 to place the sector under control of the selected bar.

*Setting mechanism*

Means is provided for effecting a simultaneous selective setting of the lever system and the selective coupling of the stop bars with the gear sector 51 to condition the machine for either positive or negative operation as required. Such means as herein shown comprises a manually operable rock shaft 85 (Figs. 6 and 7) extending transversely across the machine and suitably journaled in the frame plates 28. For adjusting the leverage mechanism or in other words shifting the fulcrum of the lever 59 from the positive or adding position as shown in Fig. 4 to the negative or subtracting position shown in Fig. 7, the shaft 85 is provided with a radially projecting arm 86 connected by a link 87 with a downwardly projecting arm 88 fast on a second transverse shaft 89. The latter shaft extends entirely across the machine below the locking dogs 61 and is provided with a series of upwardly projecting arms 90, one for each ordinal column of keys, and each adapted to engage a pin 91 on an extension 92 of the lower end of the locking dog 61 of the associated column.

Springs 93 connected between the lever arms 57 and the locking dog 61 yieldably hold the dogs in their positive or adding position with their ends 62 in blocking relation to the pins 63 of the balanced levers 59. When the shaft 85 is rocked clockwise from the position shown in Figs. 4 and 6 the arms 90 are rocked in the opposite direction and act through the pins 91 to shift the locking dogs 61 and the latch links 67 coupled therewith to the negative or subtracting position shown in Fig. 7. The lever system is thus conditioned for transmitting the complemental values of the keys to the accumulator mechanism.

Simultaneously with the adjustment of the leverage system, the connecting link 76 is shifted from engagement with the positive stop bar 71 into engagement with the negative stop bar 72 to operatively couple the latter with the gear sector 51. The shifting of the connecting link is effected in each ordinal column through the medium of a rigid link 94 (Fig. 8) connected at one end to an arm 95 rigid with the shaft 85 and at the other end to a switch guide lever 96 pivoted at its front end on a stud 97 fixed in the machine frame. The guide lever extends alongside the link 76 and is formed at its free end with a slot 98 (Fig. 12) adapted to receive a grooved roller 99 mounted on the outer end of the stud 78 carrying the collar 79. As the guide lever 96 is rocked upwardly in response to the rocking of the shaft 85 the collar is thus shifted from engagement with the fingers 81 into engagement with the fingers 82 of the negative stop bar 72.

Provision is made for locking the stop bars 71 and 72 against accidental movement when either is disengaged from the gear sector 51. For this purpose an elongated locking lever 101 (Fig. 8) is pivotally supported intermediate its ends on the adjacent frame member 28. The locking lever is formed at opposite ends with outwardly bent lugs 102 and 103 engageable respectively in notches 104 and 105 formed in the vertical flanges of the stop bars 71 and 72. Thus when the machine is set for positive operation the lug 102 is entered in the notch 104 to lock the negative stop bar 72 in inactive position. When the machine is set for negative operation the locking lever is rocked about its pivot to withdraw the lug 102 from the notch 104 thus freeing the negative stop bar and entering the lug 103 in notch 105 to lock the positive stop bar in inactive position. Positioning of the locking element is effected by a pin 106 projecting laterally from the guide lever 96 and engaging in a slotted jaw 107 formed in the end of the latch element below the lug 103.

Provision is also made for holding the operated latch links 67 in their operative positions incident to the rocking of the shaft 85 in the manner above described. This is effected by elongated latch elements 110 (Figs. 4, 6 and 7) each pivotally mounted intermediate its ends upon and adjacent to the forward end of the actuating lever 59 with which the latch link 67 is associated. Each latch element 110 is formed at its rear end with a laterally bent tailpiece 111 projecting through a slot 112 in the associated lever 59 for engagement with a hook-shaped lug 113 formed on the guide lever 96. When the machine is set for positive operation the guide lever is in its lower position and the lug 113 acts to hold the latch 110 in a withdrawn position as shown in Fig. 4. As the guide lever is rocked upwardly to condition the machine for negative operation the lug 113 is withdrawn from engagement with the tailpiece 111 thus permitting the latch element to rock clockwise under the action of a spring 114 and thereby present its forward end in blocking relation to a latch lug 115 formed on and projecting laterally from the upper end of the latch lever 67 as shown in Fig. 7.

In order to prevent the guide lever 96 from being shifted between the positive and negative positions while an actuating movement is taking place in any denominational order, each lever is formed with a laterally projecting lug 116 (Figs. 4, 7, 8 and 13) positioned for engagement by a latch element 117. The latter element is pivotally supported at its lower end on a rod 118 extending transversely across the machine frame and is provided at its upper end with a forwardly projecting latch finger 119 adapted to be positioned in the path of the lug 116. A spring 120 yieldably urges the latch element against a pin 121 carried by the link 76 which, when the machine is idle, holds the finger 119 clear of the latch lug 116. During an actuating movement the sector 51 is rocked downwardly and the link 76 moves upwardly with it, thus permitting the latch finger to move under or over the lug 116, depending upon whether the guide lever is in its upper or its lower position. In either case the lever is prevented from moving to its alternate position until the actuating movement is completed and the sector and link 76 have returned to their normal rest positions.

*Setting means*

Manually operable means is provided for rocking the shaft 85 to change the machine from positive to negative operation. In the exemplary machine, two separate finger keys are provided for this purpose—one key 121 (Figs. 1, 2, 5 and 10) is marked with a division sign, and another key 122 (Figs. 1–3) is marked with a minus sign. The use of separate keys in this connection has been found advantageous because of the slightly differing operational requirements in division and subtraction. Thus in division it is necessary to make a record of the number of times subtraction takes place as well as the remainder, whereas in subtraction only the remainder is of any importance. The mechanisms associated with the keys 121 and 122 condition the machine automatically for meeting those different requirements as will be described hereinafter.

Provision is made for automatically resetting the machine for positive operation after each subtraction or each time the machine is cleared. In addition, a manually operable key 123 designated by a plus sign is provided for resetting from negative to positive operation to allow for correction of inadvertent or erroneous actuation of the division key.

The division key 121 and the addition key 123 are arranged together at the left side of the machine as shown in Fig. 1. The keys are provided with flat stems 124 and 125 (Figs. 5 and 10) slidably supported in the key frame 26 and having their lower ends pivotally operative with opposite ends of a walking beam lever 126. The lever is supported intermediate its ends by a pivot shaft 127 carried in the machine frame so that depression of the division key 121 is effective to rock the lever counterclockwise while depression of the addition key 123 rocks the lever clockwise as viewed in the drawings. Movements of the lever are transmitted to the shaft 85 through the medium of a link 128 pivotally connected at one end to the lever and having a lost motion connection at the other end with an arm 129 rigid with and projecting radially from the left end of the shaft. The lost motion connection is provided in this instance by a pin 130 (Fig. 10) carried by the arm 129 and engaging in a longitudinal slot 131 formed in the link adjacent its lower end. A spring 132 connected between the arm 129 and the link 128 yieldably holds the pin in the upper end of the slot.

Means is provided for releasably locking the shaft 85 in the operated position to which it is rocked by the depression of the key 121. The locking means, as herein shown, comprises a toggle mechanism including a pair of links 133 and 134 pivotally connected together at their adjacent ends by a stud 135. The outer end of the link 133 is pivotally connected by a stud 136 to an extension 137 of the arm 129 while the corresponding end of the link 134 is pivotally secured to the machine frame by a short shaft 138. A spring 139 connected between the machine frame and the pivot pin 136 serves to lock the toggle when the links 133 and 134 are extended as shown in Fig. 5a, the center pivot 135 then being below a line through the pivots 136 and 138 of the links. The spring additionally serves to rock the shaft 85 back to normal when the toggle lock is broken. To prevent movement of the links beyond the locked position, the pivot pin 136 is extended to serve as a stop for the link 134 which is formed with a gooseneck extension 140 adapted to engage the stud.

The shaft 85 may be returned to the positive or adding position from the negative position above described if set by the division key by depression of the positive key 123. Depression of this key rocks the lever 126 clockwise, lifting the link 128 which, by reason of its pin and slot connection with the arm 129, is free to move while the shaft remains locked in operated position. The link 128 is formed with a laterally bent lug 140' which projects under the extended end portion 140 of the front end of the link 134 as shown in Fig. 5a and is adapted to engage and raise the link sufficiently to break the toggle lock. The spring 139 then completes the breaking of the toggle lock and rocks the shaft 85 back to the normal position shown in Figs. 5 and 10.

The machine is set for subtraction by depression of the key 122 which, as shown in Fig. 1 of the drawing, is located at the right side of the keyboard. Depression of the key serves to rock the setting shaft 85 to the operated position in the manner heretofore described and performs additional setting functions required only for the subtractive operation.

As shown in Fig. 3 of the drawings, the key 122 is provided with a flat stem 141 slidably mounted in the key frame 26 and is yieldably urged to its upper or normal position by a spring 142 similar to the springs 37 heretofore described. At its lower end, the key stem 141 engages an arcuate laterally projecting lug 143 rigid with a lever arm 144 which forms a part of a multi-armed lever 145 supported on the machine frame by a pivot stud 146. The lever 145 is operatively connected with the setting shaft 85 by a link 147 pivotally secured at one end to a depending arm 148 of the lever by means of a stud 149 and having a pin and slot connection 150 with a radially projecting arm 151 fast on the shaft 85. The arrangement is such that the depression of the key 122 is effective to rock the shaft 85 to operated position in which it is locked by the toggle mechanism previously described.

Means is provided for yieldably latching the lever 145 in either the normal or operated position. For this purpose the arm 148 is formed at its outer end with an enlarged head portion 152 (Fig. 3) having a pair of outwardly facing V-notches 153 and 154 spaced apart for cooperation alternately with a centering pin 155. The centering pin is carried at one end of a centering lever 156 pivoted on the machine frame and urged by a spring 157 in a direction to hold the centering pin in one or the other of the notches.

It is necessary in the performance of a subtractive operation of the type disclosed herein to delay actuation of the accumulator mechanism until the entire subtrahend has been set up on the keyboard and until the mechanism for entering the remainder of the complement by adding 9 in each of the other unset orders (10 in the first order) is conditioned for operation. Upon such conditioning, subtraction is effected by manipulation of a hand lever 158 (Figs. 1 and 2) as will appear presently.

To prevent actuation of the accumulator mechanism immediately upon release of a depressed digital key, means is provided for latching the mechanism against operation until the subtraction lever 158 is actuated. The latching means, as shown in Fig. 5, comprises a series of elongated hook-shaped latch fingers 161, one for each denominational order. Each of the latch fingers is pivotally supported on the machine frame and is urged by a spring into locking engagement with the lantern wheel 43 of the order with which it is associated. The latch fingers 161 are normally held in disengaged position by radially projecting lugs 163 carried by a rock shaft 164 and engaging rearward extensions 165 of the respective fingers.

The shaft 164 extends transversely across the machine frame adjacent the front of the machine and is normally held in a latch disengaging position by a locking dog 166 (Fig. 3) pivotally supported on the machine frame and coacting with a single toothed locking element 167 fast on the shaft. A link 168 connects the dog with an upwardly projecting arm 169 of the lever 145, and a spring 170 acting on the link normally holds the dog in locking relation to the element 167.

Upon depression of the subtraction key 122 the lever 145 is rocked clockwise withdrawing the dog 166 from locking position and permitting the shaft 164 to turn under the force exerted by the spring biased latch elements 161 (Fig. 5) as the latter move into locking engagement with the lantern wheels 43. Accordingly, return movement of the operated sectors 51 is prevented, the sectors being held in their depressed positions as determined by the particular digital keys operated.

Provision is also made for latching the depressed digital keys in their depressed positions pending the completion of the subtractive operation. For this purpose the stop lugs 75 of the negative stop bars 72 are provided at their front edges with forwardly projecting lugs 171 (Figs. 7 and 18) adapted upon movement of the bars to operated position to engage in slots 172 (Fig. 7) in the key stems. As the stop bars are coupled directly to the gear sectors they are, of course, held in operated position while the lantern wheels are locked and the depressed keys are consequently prevented from rising prematurely by presence of the lug 171 in the slots 172 which prevent full return of such depressed keys.

In performing subtractive operations on key-driven calculating machines as heretofore constructed, it is necessary for the operator to ignore the numeral "9" when it occurs in the subtrahend in any order except the rightmost order to be operated, in which case it is diminished by one and registered as "8." The complication involved in distinguishing between the orders in which the 9's occur is obviated in the present calculating machine in which the 9's keys are operated just like any other key in entering a subtrahend. To provide for registration of the proper values under such conditions means is provided for automatically locking the actuating mechanism against operation by the "9's" keys of all orders above the unit order while permitting sufficient operative movements of the keys to satisfy the operator that action has taken place by the nine key being locked down when so depressed. This locking mechanism is conditioned for action by the depression of the subtraction key 122.

The "9's" key locking mechanism as shown in Figs. 14–17 comprises a thrust lever 175 for each denominational order except the units order at the extreme right side of the keyboard. The levers are alike in construction, each being formed at one end with laterally projecting lugs 176 adapted to engage in guide slots in the key frame plates 33 and 34. Forwardly of the lug 76 are opposed radial surfaces 177 adapted to engage the frame plates and provide a shifting pivot for the lever. A torsion spring 178 carried by a stud 179 located centrally of the surfaces 177 and having its ends engaged respectively under a stop lug 180 on the lever and in a hole in the frame plate 34 urges the lever rearwardly in the guide slots and tends to raise the rear end to the position shown in Fig. 15.

Intermediate the ends of the lever 175 the upper edge portion is bent over to form a laterally projecting lip 181 normally positioned at the rear of the stem of the associated digital key and adapted to enter a notch 182 in the side edge of the key stem when the lever is shifted forwardly. The extreme end portion of the lever forming the lip is further bent to form a vertically disposed depending head 183 guided in a slot 184 in the frame plate 34. When the lever 175 is rocked to the operated position shown in Fig. 17 the head 183 is moved into blocking relation to a pair of laterally projecting lugs 185 and 186 formed respectively on the stop bars 71 and 72 and is thereby effective to lock the bars against forward movement.

Rocking of the lever 175 is effected by depression of the associated "9's" key through the connection provided by the lip 181 engaging in the slot 182. It will be apparent that the lever is operative to limit the downward movement of the associated digital key as well as the forward movement of the stop bars 71 and 72 so that no actuating movement is imparted to the actuating mechanism and consequently no operation of the accumulator mechanism occurs upon depression of a "9's" key in orders other than the units order. In subtraction, depression of a "9" key in the units order adds its complement 1.

The lever 175 is normally held in an inactive position by the spring 179 which urges the lever rearwardly so that the lip 181 is withdrawn from the notch 182 as shown in Fig. 15. The forward shifting of the lever to condition it for operation is effected as an incident to the rocking of the subtraction lever 145 by the subtraction key 122 (see Fig. 3). For this purpose the lever arm 148 is connected by a link 187 with an arm 188 fast on a rock shaft 189 extending transversely across the machine frame at the rear of the machine.

Referring to Figs. 15–18 of the drawings, the shaft 189 is provided with a series of radially projecting lugs 190, one for each denominational order except the first or units order. Each lug is operative when the shaft is rocked (counterclockwise as viewed in Figs. 15–17) to engage a pivoted lever 191 and swing its lower bent lip forwardly against the rear edge of the head 183 thereby shifting the lever 175 forwardly to the working position in which it is shown in Fig. 16. A second series of lugs 192 projecting from the opposite side of the shaft 189 includes a lug for each denominational order except the first. Each lug 192 is arranged to coact with a depending finger 193 formed on a latch element 194 pivotally supported on the machine frame above the free end of the lever 175. When the machine is set for positive operation the shaft 189 is positioned so that the lug 192 acts to hold the latch element in disengaged position as disclosed in Fig. 15. When the shaft 189 is rocked to the negative calculating position, the latch element is rocked by a spring 194' into engagement with the forward edge of an upstanding lug 195 formed at the rear of the lever 175. Upon depression of the lever, the latch element swings over and in blocking relation to the top of the lug as shown in Fig. 17 and thus prevents return of the lever and key to their position when the digital key is released.

As stated heretofore, the actual subtracting operation is effected by manipulation of the subtraction lever 158 after the subtrahend has been fully set up on the keyboard. Referring to Fig. 3 of the drawings, the subtraction lever is keyed to a hub 201 rigid with an arm 202 loosely mounted on a rock shaft 203 journaled in the machine frame and extending transversely thereacross. Another arm 204 fixed to the shaft and operating close in line with the arm 202 is connected therewith by a toggle lock formed by links 205 and 206 pivotally interconnected in the usual manner. When the toggle is locked as shown in Fig. 3, the subtraction lever is operatively connected with the shaft and effective to rock it in an anticlockwise direction when the lever is pulled forwardly by the operator, as shown in Fig. 3.

The shaft 203 is normally locked against operation by a locking dog 207 pivotally supported on the machine frame and urged by a spring 208 into blocking relation to a lug 209 rigid with and projecting from one end of the arm 204. The locking dog 207 is retracted to release the shaft 203 for operation incident to the depression of the subtraction key 122. Such retraction is effected by a link 211 connected at one end to the dog and having at its other end a slot 212 adapted to receive the projecting end of the stud 149 carried by the lever arm 148.

*Auxiliary and universal power mechanism*

With the machine conditioned for subtraction as above described, and the subtrahend entered on the keyboard, the subtractive operation is carried out by pulling the hand lever 158 forwardly and thereby supplying auxiliary and universal power by rocking the shaft 203 in a counterclockwise direction as viewed in Fig. 3, or clockwise as viewed in Figs. 4 and 5. One result of the rocking of the shaft 203 is the application of power for the addition of 9's in all orders (10 in the units order) not preset or locked in the setting of the subtrahend to register the complete complement of the subtrahend and thus leave the correct remainder showing on the numeral wheels of the accumulator.

The mechanism for automatically supplying power for adding 9's in orders above the unit and 10 in the units order includes a series of levers 215 (Fig. 4) each pivotally supported on the actuator lever supporting pivot shaft 56' and having a laterally bent lug 216 at its free end overlying the upper edge of the associated actuator lever 56. Each lever 215 is operatively connected by a coiled spring 217 with an arm 218 fast on the auxiliary power shaft 203. As herein shown, the spring 217 is anchored at its lower end to a link or ram 219 pivotally secured to the arm 218 and projecting axially through the coiled spring. The other end of the spring is anchored to a stud 220 projecting laterally from the associated lever 215.

The ram 219 is of a length such that its upper end normally engages the stud 220 and holds the lever 215 slightly elevated so that normally no pressure of the power unit is exerted on the actuating lever 56. When the auxiliary power shaft is rocked, the rams 219 are pulled down thus allowing the levers 215 to move under the influence of the actuating springs 217 and depress the actuating levers 56 sufficiently to add ten in the units order and nine in all other orders in which the actuating levers are not locked by the setting of the subtrahend. In the case of locked levers the actuating springs 217 yield without imparting movement thereto.

The movements of the depressed actuating levers 56 are transmitted to their gear sectors 51 for operating the accumulator mechanisms in the manner heretofore described. To minimize the force required for that purpose and thus facilitate the setting of the gear sectors by the levers 215, means is provided for temporarily relieving the tension of the sector actuating springs 64. To this end each spring 64 is coiled around an elongated link or ram 221 (Figs. 4 and 6) and the fixed end of the spring is secured thereto as by threading over a notched section 222 adjacent the outer end of the ram. The said outer end of the ram is secured by a lost motion connection to an arm 223 fast on a rock shaft 224 journaled in the machine frame, such connection being provided by a stud 225 on the arm engaging in a slot 226 in the ram. The arrangement is such that when the shaft 224 is in its normal position as shown in Fig. 4, the forward end of the ram just clears the stud 65 which anchors the actuating spring to its sector 51. As the shaft is rocked toward the operated position, the ram is permitted to move forwardly against the stud and thus relieve the tension of the spring. In the case of sectors that have been preset in the setting up of the subtrahend, this relief of tension has no effect as such sectors are locked in place as heretofore explained and the stud 225 merely moves along the slot 226. The other sectors may then be rocked through the action of the 9's auxiliary actuating mechanism without requiring the application of an excessive amount of power.

The rocking of the shaft 224 to its spring released position is effected as an incident to the actuation of the auxiliary power actuating lever 158 and the shaft is automatically returned to normal rest position at a precisely timed point in the cycle of its operation to complete the auxiliary power operation. Such movements of the shaft 224 are controlled by a toggle mechanism including a pair of links 229 and 230 joined by a center pivot stud 231 as shown in Fig. 5. The forward end of the link 229 is pivotally connected to a crank arm 232 rigid with the shaft 224 while the corresponding end of the companion link 230 is pivoted on a short shaft 233 carried in the machine frame. The link 230 is formed with an upwardly projecting arm 234 connected by a link 235 with a downwardly projecting arm 236 fast on the auxiliary actuating power shaft 203. Accordingly, the clockwise rocking of the shaft 203 (as viewed in Fig. 5) serves to break the toggle lock and release the shaft 224 and the tension of all the sector actuating springs 64. When the shaft 203 is returned to its normal position the toggle links are again straightened out, thus rocking the shaft 224 back to normal position and restoring the full tension of the springs 64 during the last 1/100 of an inch of motion of the studs 225 as the toggle is exerting its greatest power action.

In the forward movement of the auxiliary power actuating lever 158, the multi-armed lever 145 which was operated by depression of the subtraction key 122 is restored to the normal position occupied when the machine is set for positive operation. Such return is effected by an offset arm 241 (Fig. 3) rigid with and projecting downwardly from the arm 201. The arm 241 carries a stud 242 operating in and adapted to engage the lower end of a slot 243 in the lower end of a link 244 which is pivotally connected at its upper end to a depending arm 245 of the lever 145. Return of the lever 145 to normal position restores the locking dog 166 to operative position and resets the latch 207 for operation.

The return of the lever 145 also results in the retraction of the link 187 by which the shaft 189 was initially operated to condition the No. 9 key when set to prevent action in that order. To hold all set No. 9 keys in action until return of the auxiliary power shaft 203 in its normal positions, means are provided for latching the shaft 189 in its operated position under direct control of the auxiliary power shaft 203. As shown in Fig. 5 of the drawings, the latching means comprises a latch dog 246 pivotally supported on the machine frame and yieldably urged by a spring 247 into latching engagement with a toothed latch element 248 fast on the shaft 189. A link 249 having a lost motion connection at one end with the latch dog and pivotally connected at the other end to an arm 250 rigid with the shaft 203 normally holds the latch element in a disengaging position. As the auxiliary power lever is pulled forwardly the link 249 is raised, thus allowing the dog 246 to engage the latch element 248 and lock the shaft 189 in an operated position. The return of the shaft 189 to normal position is effected through the action of the link 249 to retract the dog 246 as it returns to normal and thus release the shaft 189 for return movement.

Near the end of the action of the auxiliary power lever 158 the accumulator latch mechanism is released so that registration may take place upon restoration of the tension of the sector actuator springs 64. The release of the accumulator latch mechanism is effected by the auxiliary power shaft 203 through the medium of the arm 236 which is connected by a link 256 (Fig. 5) with an arm 257 fast on the latch control shaft 164. The connection with the arm 257 is provided by a stud 258 engaging in a slot 259 in the link so as to permit the control shaft to be rocked to operated position by the subtraction key prior to the operation of the auxiliary power lever. As the link 256 is drawn rearwardly during the operation of the auxiliary power lever, the end of the slot engages the stud 258 and rocks the shaft 164 clockwise thereby causing the lugs 163 to lift the locking detents 161 from engagement with the lantern wheels 43.

As the auxiliary power lever approaches the limit of its forward movement, a rearward extension 261 (Fig. 3) of the toggle link 206 engages a stud 262 fixed on the machine frame, thus breaking the toggle lock which operatively connects the auxiliary power lever with its shaft 203 just at the instant the said lever reaches its full forward throw. Thus the shaft is released from the lever and control of the further action of it until the machine is again set for subtraction and is so rendered independent of any further manipulative actions taken by the operator. The shaft 203 when thus released is returned to normal rest position by a spring 263 anchored at one end to a stud 264 fixed on the machine frame and at the other end to a downward extension 265 of the arm 204. In its return movement the shaft 203 acts through the toggle links 229 and 230 to rock the shaft 224 counterclockwise, as viewed in Fig. 5, whereby the sector actuating springs 64 are retensioned. It may be noted that in retensioning the springs it is only necessary to stretch them sufficiently to disengage their rams 1/100 of an inch from the studs 65. This action is timed to occur just as the toggle links 229 and 230 are passing over their locking center at which point the force multiplying action of the toggle is at its maximum. The power for this operation is supplied, of course, by the spring 263 assisted by the tension of the springs 217 in the denominational orders in which the actuating mechanism has been preset or locked against operation.

The restoration of the tension of the springs 64 immediately serves to rock the sectors 51 from their set positions back to their normal rest positions. In this return movement, the accumulator number wheels 22 are operated in the usual way to register the values represented by the setting of the sectors. In the case of sectors set for the registration of the subtrahend, the amounts transferred to the number wheels are the complements of the values represented by the digital keys actuated to set the sectors. In all other orders, except the first, "9" is registered in the accumulator mechanism, "10" being registered in the first order when required.

In order to prevent false operation of the overflow numeral wheel 22' where there is no actuating mechanism to clear away the carry of the tens which occurs under such a method of subtraction means is provided for preventing a tens carrying operation from the highest actuated denominational order of the machine to such wheels. For this purpose the link 256 by which the accumulator latching elements are released, is provided at its forward end with a laterally projecting lug 266 (Fig. 5) adapted to engage the tip of a carry cutout lever 267 operating in the overflow order. The carry cutout lever, as herein shown, is of well known construction and operates through an extended tailpiece 268 to shift the carrying pawl 50 of the overflow order to an inactive position.

Subtraction safety devices

It is obvious that if, during subtraction, it were possible to operate the clearing or cancelling mechanism or to operate the addition setting key that mechanism would be displaced which would make subtraction impossible. Therefore, as a means of safety against such an error, the clearing or cancelling mechanism is locked as the subtraction key 122 is depressed. Likewise, through the same medium, the addition setting key 125 is locked as the subtraction setting key is depressed.

The means generally is not new in this invention as practically the same means is employed in my pending application Serial No. 494,907, herein previously referred to, and in the present case consists of the lock lever 310 pivoted at its lower end on a stud 311 (see Fig. 3) fixed in the framework and connected near its upper end by a short link (not shown) to the arm 275. The arm 275 is fast on a short cross shaft 274, with the result that when the cancelling lever 25 is pulled forward the upper end of the lever 310 is also swung forward. It will be noted that the upper end of the said lever is provided with a laterally bent portion 312. Located just below the laterally bent portion 312 and to the left thereof, an arm 313 forming one of the arms of the multi-armed lever 145 is also provided with a lateral extension 314 at right angles with the lateral extension 312 and so arranged that either lateral extension will, when moved, block the action of the other. Therefore, when the subtraction key 122 is depressed or set, the lateral portion 314 of the arm 313 of the multi-armed lever 145 makes movement of the cancelling lever 25 impossible. Or if the cancelling lever should be left partly operated, the subtraction key 122 cannot be depressed, as the lateral extension 312 would block the upward swing of the arm 313 of the lever 145, thereby preventing the downward movement of the lateral lug 143 by the shank 141 of the subtraction key.

The locking of the addition setting key during subtraction is accomplished also by depression of the subtraction key 122. It has been disclosed how the rock shaft 164 (see Fig. 5) is rocked clockwise (as viewed in Fig. 3) when released by its detaining dog 166 (Fig. 3). At the left end of the said shaft the arm 257 keyed to said shaft through its stud 259 operates a link 320 by means of a slot therein to pull the said link forward. The rear end of said link is pivotally connected to the upper left end 321 of a lock lever having two upstanding arms, one to which the link is connected, as stated, and another, 322, to the right thereof which, when the shank 125 of the addition setting key is raised by the setting of the subtraction key, underlies the lower end of said key so that a spring 323 operating about the pivot 324 swings the said arm under the key shank, locking it against depression until it is again withdrawn from its locking position by the action of the link 256 in clearing the locking detents 161 and relatching of shaft 164 by the locking dog 166 (Fig. 3).

Resetting for positive operation

As positive forms of calculation such as addition and multiplication ordinarily comprise about 80% of the work in accounting, it has been found advantageous to provide for automatically resetting the machine for positive operation after a negative operation. As described heretofore, such resetting is effected after a subtraction by restoration of the multi-armed lever 145 to its normal rest position and the release of various latches as an incident to the operation of the auxiliary power lever 158. The means by which the actuation toggle lock is broken and the actuation control shaft 85 is reset for addition will now be explained. When the arm 236 on the power lever shaft 203 breaks the actuation spring tension, the arm 232 on the shaft 224 by means of the pin 232' contacts the arm 134' of the toggle link 134, breaking the toggle above center, where it is caught during this phase of the operation by a shouldered latch member 269 (Figs. 5, 5a and 10) which is allowed to move over a latching lug 270 formed on the toggle link 134. The latch member is normally held in a retracted position against spring tension by the pin 271 carried by the link 256 and engaging a detent 272 rigid with the latch member. As the link is drawn rearwardly the detent and latch element follow under the influence of a spring 273. When the pin 271 returns with the link 256 the latch is removed, allowing the toggle to double up and rock the actuating control shaft 85 into an adding position. Resetting through the medium of the adding key 123 has also been described.

In addition to the foregoing, means is provided for resetting for positive operation in response to the clearing or "zeroizing" of the register. As explained heretofore, clearing of the register is effected by rocking the frame 24' away from the normal position shown in Fig. 5 to detrain the driving gears for the accumulator mechanism. Rocking of the frame 24' is effected by the zeroizing lever 25 (Figs. 1 and 2) which is located at the right side of the machine and keyed to the projecting end of a short cross shaft 274 (Fig. 3) journaled on the machine frame. An arm 275 fast on the shaft is connected by a link 276 with an intermediate point on a lever 277 which is pivoted at one end on the machine frame and connected at the other end by a link 278 with an arm 279 loosely mounted on a shaft 280 hereinafter called the "zeroizing" shaft. A lug projecting laterally from the arm 279 for engagement with a similar arm 279' fast on the shaft 280 provides a one-way connection whereby the shaft may be rocked to operated position as the zeroizing lever 25 is pulled forwardly and is permitted to remain in such position while the lever returns to normal rest position.

When rocked to operated position the shaft 280 swings the rock frame 24' to a zeroizing position through the medium of a series of links 281 (Fig. 5) connected between the frame and arms 282 rigid with the shaft. A notched segmental extension 283 (Fig. 3) at the free end of the arm 275 cooperates with a double acting spring actuated locking pawl 284 in well known manner to compel operation of the zeroizing lever through a full stroke in each direction on each actuation.

Means is provided for locking the zeroizing shaft 280 in operated position pending the depression of a digit key to begin the next calculation. The locking means as shown in Fig. 5 of the drawings comprises a toggle lock mechanism including a pair of links 285 and 286 pivotally interconnected by a pivot stud 287. The link 285 is pivotally connected at its outer end to an arm 288 rigid with the shaft 280 while the link 286 is pivoted on a short shaft 289 mounted in the machine frame. The arrangement is such that the toggle links when straightened out in a clearing action of the shaft 280, as described, move over a center position and lock as the shaft approaches operated position, and the locked toggle accordingly acts to hold the shaft in such position.

When the toggle lock is broken, the shaft 280 is returned to normal position by a spring 290 connecting between a stud in the arm 288 and the machine frame. For breaking the toggle lock there is provided a trip shaft 291 (Figs. 4-7) journaled in and extending transversely across the machine frame adjacent the rear end of the machine. A series of cam arms 292 fast on the shaft, one for each column of keys, are positioned for engagement by cam rolls 293 carried at the lower ends of the arms 55 of the bell crank actuating levers 56. As an incident to such rocking action the shaft 291 is rocked in a clockwise direction as viewed in Fig. 5.

The rocking movement of the trip shaft acts to break the toggle lock for the shaft 280 through the medium of an arm 294 (Fig. 5) fast on the trip shaft and connected by the link 295 with an arm 296 pivotally supported by the shaft 289 which supports the toggle link 286 and to which it is made fast. The connection between the link 295 and the arm 296 is provided by a stud 297 which is extended so the head may engage an upwardly projecting arm 298 formed on the toggle link. A spring 299 connected between the machine frame and an arm 300 rigid with the arm 296 urges the latter forwardly and serves to maintain the trip shaft and associated elements in an inactive position. As the link 295 is drawn rearwardly by the trip shaft, the stud 297 is operative to rock the toggle link 286 over its locking center and thus break the toggle lock for the shaft 289. The latter, of course, is restored to normal position by the spring 290, as heretofore explained.

For resetting the machine for positive operation, the toggle link 286 is formed with a depending arm 301 (Fig. 5) operative in the movement of the toggle link to locking position to engage a pin 302 (Figs. 5 and 10) projecting from the division key link 128 providing that the link is in its lower or negative set position. Upon such engagement, the link 128 is shifted upwardly to break the toggle lock for the subtraction shaft 85 as heretofore explained, which is immediately returned to the positive set position by the spring 136. The machine is thus automatically conditioned for positive operation.

*Operation*

Positive forms of calculation such as addition and multiplication are in the same manner as with prior calculating machines. When the machine is set for positive calculation, the dog 61 and the lug 60, in effect, latch the rear end of the balanced lever 59 to the bell crank lever 56 so that both levers rock as a unit about the fulcrum of the bell crank. The keys of each order accordingly act through the lever 59 to rock the lever 56 and thereby displace the sector gear 51 gradually increasing amounts in the order of progression of the key numbers so as to register in the accumulator mechanism the numerical values of depressed keys.

The extent of displacement of the sector gear 51 is controlled by the positive stop bar 71 in the usual way and actuation of the accumulator mechanism to register a key value is effected in the return of the sector gear by its actuating spring 64. Upon completion of the calculation, the register is cleared or zeroized by actuation of the zeroizing lever 25 unless it is desired to add other totals to that accumulated.

The improved and simplified techniques by which negative calculations may be carried out with the improved calculating machine will be readily apparent from a consideration of the operations involved in the solution of a few problems of the type commonly met with in accounting practice. As an example, assume that the operator has accumulated the sum of 63,-785.64 on the register either by depression of the corresponding keys or by the addition of a plurality of smaller amounts and is required to subtract therefrom the amount 648.75. Before entering the subtrahend, the subtraction key 122 is depressed to condition the machine for subtractive negative operation. Depression of the subtraction key 122 conditions the actuating mechanism 23 for registering complemental values by setting the leverage system so as to substantially reverse the progression of the displacements imparted to the sector gear by the keys 1-9 of the order. More particularly, the depression of the subtraction key withdraws the dog 61 to release the rear end of the balanced lever 59 from the bell crank lever 56 and establishes a fulcrum for the forward end of the lever by engaging the hooked end of the latch element 67 over the stud 68 carried by the lever.

In addition to conditioning the actuating mechanism for negative operation, depression of the subtraction key switches the connection of the gear sector 51 from the positive stop bar 71 to the negative stop bar 72; releases the latch detents 161 for latching the sectors in key set positions; shifts the 9's key locking levers 175 to active position; and withdraws the latch element 207 to free the auxiliary power lever 153 for manipulation. These conditioning actions are effected through the medium of the multi-armed lever 145 and the associated control instrumentalities associated with it.

Having set the machine for subtraction, the subtrahend is now entered on the keyboard, that is, keys 648.75 in the proper ordinal columns are depressed either successively or simultaneously as is most convenient. By reason of the negative setting of the actuating mechanism, the depression of the above keys displaces their sectors 51 for the addition of the complemental values, namely, 351.25 to the accumulator.

The adding of the complemental values of the digital keys to register the subtrahend does not take place immediately upon the release of the keys as the actuating mechanisms associated therewith are locked in set positions by the accumulator latches 161. The keys themselves are latched in depressed positions by the latch lugs 171 of the negative stop bars 72 so that the operator may readily check the accuracy of the figures set for registration.

Following the setting up of the subtrahend on the keyboard, the auxiliary power lever 158 is pulled forward to furnish power for all orders and release the accumulator mechanism latches 161 so that the subtrahend values may be transferred to the numeral wheels 22 as the actuating mechanism sector gears 51 return to normal position under the spring actuation set up by the auxiliary power shaft movement. The forward movement of the auxiliary power lever also relieves the tension of all the sector gear actuating springs 64 and reconditions them again to register all orders of adding mechanisms for operation by depressing the bell crank levers 56 and displacing their associated sector gears 51 sufficiently to add 9 in each previously unset order except the units order where 10 will be added if not preset.

When the auxiliary power lever 158 reaches its forward limit position, the toggle lock with the subtraction shaft 293 is broken thus freeing the shaft for return movement independently of the lever under the influence of the spring 263. In the return of the auxiliary power shaft, the tension of the sector actuating springs is restored and the sectors are accordingly returned to normal position thereby transferring there set values to the numeral wheels. The levers 215 of the auxiliary power mechanism are released prior to the retensioning of the springs 64 so that all sectors are restored to normal at the same time.

In the specific problem set out above the values transferred to the numeral wheels are as follows:

Register total or minuend _____ 63,785.64
Subtrahend complement _____    351.25
Automatic 9's adding mechanism _____ 99,000.00

Remainder shown on register ___ 63,136.89

Assume by way of illustration that the amount to be subtracted from the above minuend is 648.00 instead of 648.75 as in the previous problem. In that case the subtrahend complement is 351.00 and the operation includes the automatic addition of 10 in the units order as shown below:

Register total or minuend _____ 63,785.64
Subtrahend complement _____    351.00
Amount added automatically in unit
  column _____       .10
Automatic 9's adding mechanism _____ 99,000.90

Remainder shown on register ___ 63,137.64

It will be observed that the operations above illustrated do not require the operator to remember any complemental key markings or to employ the dual touch system. The subtrahends are set up by the same touch system used for setting up the minuend or for adding. Thus the operator's work is greatly simplified, the likelihood of errors occurring is reduced and the speed with which negative calculations may be made is materially increased.

A further advantage is derived from the arrangement for locking the actuating mechanism against operation upon depression of the 9's key of any order. In calculating machines as heretofore constructed, it is necessary to ignore all 9's occurring in the subtrahend except as the last significant figure. Thus in entering the number 24691 as the subtrahend the 9 is ignored. For the numbers such as 24690, 24900 or 249, on the other hand, the operator is required to subtract one from the 9 mentally and depress the eight key of the appropriate order. The mental calculations required to set up such subtrahend correctly are entirely eliminated by the improved machine since the operator is required to actuate a key for each "9" appearing but false registration thereof is automatically prevented by the key locking mechanisms. It will be evident that the speed of operation is materially increased and the mental strain on the operator is substantially reduced.

While the foregoing explanations may leave the impression that the subtractive operation is a relatively slow one, it is actually much quicker than the method heretofore in use in which the rules had to be varied under different conditions. Thus the operating method made possible by the improved calculating machine eliminates the necessity of selecting the proper carry cutout lever, the mental gymnastics of deciding when to register and when to ignore 9's in the subtrahend and the learning of a dual touch system as required for complementally or dual marked keyboards. All such complications are eliminated leaving only the depression of keys having only one marked value and the simple operation of the subtraction key and the auxiliary power lever.

Division, which is simply a multiple subtractive operation, is carried out in the same manner as formerly which with the advantages inherent in the uni-marked keyboard greatly simplifies such calculation. All numerals appearing in the divisor are registered on the keyboard including the zeros for which the 9's keys are used. These keys are appropriately marked for the purpose by the small "o" located at the left of the 9. As the operation of the division key 121 conditions the actuating mechanism 23 for registering complemental values and connects up the negative stop bar 71 without releasing the accumulator latches 161, the remainders appear on the numeral wheels immediately upon release of the depressed keys. Carrying of tens takes place as for adding and provides a visual indication of the result in the usual way.

It will be apparent from the foregoing that the invention provides a key-driven calculating machine of novel and advantageous construction. Through the provision of the novel means for selectively controlling the degree of actuation of the accumulator mechanism by the digital keys, the machine may be conditioned for either positive or negative operations by the use of a single touch system. In other words, by conditioning the machine for the particular type of operation required, the use of dual marked keys and consequently a dual touch system is eliminated. Thus the work of the operator is materially simplified and moreover the number of mental calculations required are greatly reduced. As the result, the performance of negative operations such as subtraction or division are greatly simplified and the operations speeded up, all with less effort on the part of the operator and with less likelihood of error.

I claim as my invention:

1. In a key-driven calculator having denominational orders of register wheels, manually depressible keys and key-actuated levers for operating said register wheels, automatic carrying mechanism for carrying the tens from a lower to a higher wheel, the adding movement taking place on the up-stroke of the levers and keys; means operative for locking said register wheels to delay the return of the said levers from a down stroke and thereby delaying the adding action of any of said denominational orders; means operable manually for collectively depressing the levers of such remaining orders, as have not been key-depressed, to a degree that will cause all such orders except the units order when released or allowed to rise to add nine in their respective orders, and in the units order far enough to add ten, if the lever in that order has not been key-depressed, and means for interrupting the action of said manually operable means and said locking means so that the denominational orders of levers may be free to rise and turn their associated register wheels in an adding action.

2. In a key-driven calculator having denominational orders of key-operated spring-actuated adding mechanisms in which power is accumulated by key depression for effecting an adding movement, means for latching the adding mechanisms in operated position as they are operated for setting up a subtrahend in subtraction, and manipulative means for releasing the latched orders of adding mechanism and for operating the adding mechanisms of unlatched orders of the machine to add amounts in said orders to complete a complement of the subtrahend.

3. In a key-driven calculating machine, denominational orders of adding mechanism each including a sector gear as the prime actuator in each said order, an actuating spring for each sector gear, means including a toggle lock for tensioning the said springs and to lock them in a tensioned state, and means for breaking said toggle lock to temporarily release the spring tension whereby to facilitate the setting of said gear sectors.

4. In a key-driven calculator, denominational orders of adding mechanism, including accumulator mechanism inter-ordinally connected by automatic carrying mechanism, manually operable keys and spring actuated sector gears operated by the keys for actuating the accumulator mechanism in combination with means for operating all the said actuating sector gears en masse independent of the said keys, a manipulative device settable to condition said means for operation, and a hand lever operable to supply power to said means for actuating the said sector gears en masse when so conditioned.

5. In a key-driven calculator, denominational orders of adding mechanism, actuating mechanism for each order including a set of digit keys marked from 1 to 9 and a lever arranged for actuation by each of the keys of each order and having a plurality of fulcrums, said fulcrums being pre-settable to condition said actuating mechanism for adding the amount of the key marking of the keys depressed as in addition, or for adding the complement of the key markings when set for subtraction or division, and indicative manipulative means for pre-setting said fulcrums for adding, subtracting or dividing.

6. In a key-driven calculator, denominational orders of adding mechanism, actuating mechanism for each order including a set of digit keys marked from 1 to 9 and a lever arranged for actuation by all of the keys of the order and having a plurality of fulcrums selectively operable to condition said actuating mechanisms for adding either the marked values of the keys operated for positive forms of calculation or complements of the marked values of the keys operated for negative forms of calculation, manually operable means for setting said fulcrums to condition said actuating mechanism for negative forms of operation, means operable to clear said adding mechanism, means operable by said clearing mechanism for re-setting said actuating mechanism for positive forms of calculation.

7. In a key-driven calculator, denominational orders of adding mechanism, actuating mechanism for each order including a set of digit keys marked from 1 to 9 and a lever arranged for actuation by all of the keys of the order and having a plurality of fulcrums normally operable to condition said actuating mechanisms for adding the marked values of the keys operated for addition, said fulcrums being settable to condition the actuating mechanisms for adding the complement of the marked values of the keys operated for subtraction, means for clearing said adding mechanism, means operable by said clearing means for setting said fulcrums for addition if set for subtraction, and other means for re-setting said fulcrums for addition as an incident to the performance of a subtractive operation.

8. In a key-driven calculator, denominational orders of adding mechanism, actuating mechanism for each of said orders including a set of digital keys and a compound lever system having component parts normally associated in a manner such that the marked values of operated keys are added in said adding mechanisms, settable means modifying the action of said lever systems to effect the adding of complements of the key markings to adapt the calculator for subtraction, means for clearing said adding mechanism, and means operable by said clearing means for re-setting said lever systems to their normal condition.

9. In a key-driven calculator, denominational orders of adding mechanism, actuating mechanism for each of said orders including a set of digital keys and a compound lever system having component parts normally associated in a manner such that the marked values of operated keys are added in said mechanism, settable means for setting said lever systems to effect the adding of complements of key markings to adapt the calculator for subtraction, means for clearing said adding mechanism, means operable by said clearing means for re-setting said lever systems to their normal condition, and manually operable means operable to re-set said lever systems to their normal condition independently of said clearing means.

10. In a key-driven calculating machine having register wheels for accumulating totals, a geared sector for each register wheel for actuating the same in an accumulative movement, ordinal sets of digitally marked keys, there being nine keys in each order, eight of which carry a single number from 1 to 8 and the ninth of which carries the numbers 9 and 0, a key-operated lever means for actuating each of said sectors including a lever having two fulcrums, one serving as a permanent fulcrum and the other as an auxiliary fulcrum, and manually operable means for rendering said auxiliary fulcrum inactive or active selectively to condition the machine respectively for addition or for subtraction and division.

11. In a key-driven calculator having denominational orders of registering mechanism, a digitally marked keyboard having a plurality of orders, there being nine keys in each order, eight of which carry a single number from 1 to 8 and the ninth of which carries the numbers 9 and 0, and actuating means interposed between the keys of the keyboard and the registering mechanism normally effective to transmit key movements thereto for the performance of positive forms of calculation such as addition and multiplication by operation according to the key markings, means operable to change the motion transmitting action of the actuating means for conditioning the same for negative forms of calculation such as subtraction and division by operation according to the same key markings, and manually operable auxiliary means operative when the actuating means is conditioned for subtraction for operating the actuating means in all orders previously unoperated in the setting of a subtrahend upon the keyboard to add nines in all such orders except the units order and to add ten in the said units order.

12. In a key-driven calculator having a digitally marked keyboard having a plurality of orders, there being nine keys in each order, eight of which carry a single number from 1 to 8 and the ninth of which carries the numbers 9 and 0, a registering accumulator and a key-driven mechanism therefor, means for conditioning the key-driven mechanism so that it may perform positive forms of calculation such as addition and multiplication by operation according to the key marking, means for conditioning the key-driven mechanism to perform negative forms of calculation such as subtraction and division by operation according to the same key marking, dual stop mechanism coacting with the keys for controlling the action of said key-driven mechanism differentially in positive forms of calculation and in negative forms of calculation, the stop mechanism when operating in negative forms of calculation coacting with the keys to lock the same at the end of a down-key stroke whereby to prevent any depressed key from returning to normal, and manually operable auxiliary means operative when the actuating mechanism is conditioned for subtraction for operating the key-driven mechanism in all orders in which a key has been depressed in accordance with the key marking and for operating the key-driven mechanism in all orders in which a key has not been depressed to add nines in all such orders except the units order and to add ten in the units order.

13. In a key-driven calculator, denominational orders of adding mechanism each including a digitally uni-marked set of keys and a lever adapted to be fulcrumed at different points to give varying degrees of adding action upon depression of the same key, manually operable means for selecting the fulcrums for action, dual stop mechanism including two stop devices, one acting when one of the fulcrums is effective and the other acting when the other fulcrum is effective to gauge the varying degrees of action of each key.

14. In a key-driven calculating machine, denominational orders of adding mechanism each including a sector gear, an actuating spring therefor and a group of manually operable keys for actuating the sector gear, means including a toggle lock for tensioning the springs of the sector gears of the several orders and for locking them in a tensioned state, means for operating the denominational orders of adding mechanism independently of the keys including means for releasing the toggle lock to temporarily relieve the sector gears of the tension of their springs, means operative to make up the toggle lock to tension the springs for the return of said sector gears, said operating means including a manipulative device effective to supply power to actuate the sector gears, and a spring tensioned by said manipulative device to provide power for making up said toggle lock upon the release of said manipulative device.

15. In a key-driven calculating machine, denominational orders of adding mechanism each including a sector gear, an actuating spring therefor and a group of manually operable means for actuating the sector gear, means including a toggle lock for tensioning the springs of the sector gears of the several orders and for locking them in tensioned state, auxiliary means for actuating the sector gears independently of said keys, means for latching a key-actuated sector gear of any of said orders in actuated position to pre-set it for an adding movement, means released by the action of said auxiliary actuating means to initiate the said adding movements of the key-set sector gears, other means operated by said auxiliary actuating means for operating said toggle lock to retension the springs of the sector gears to provide spring action for all the sector gears so that they may execute their adding strokes and add whatever they may have been set to add by either the keys or by the auxiliary actuating means.

16. In a key-driven calculating machine, denominational orders of adding mechanism each including a sector gear, an actuating spring therefor and a group of manually operable keys for actuating the sector gears, means including a toggle lock for tensioning the springs of the sector gears of the several orders and for locking them in a tensioned state, auxiliary means for operating the adding mechanisms independently of the keys, means for latching a key-actuated sector gear of any of said orders in an actuated position to preset it for an adding movement, means operated by the auxiliary actuating means to release the latched sector gears for their adding movements, other means operated by said auxiliary actuating means for operating the toggle lock to retension the springs of the sector gears prior to the release of the latch means whereby to provide spring action for all sector gears so that they may execute their adding strokes and add whatever they may have been set to add by either the keys or the auxiliary actuating means, said auxiliary actuating means including a manipulative device operative to supply power to actuate the sector gears, and a spring tensioned by said device to supply power to return the auxiliary actuating means to normal position independently of control by said manipulative device.

17. In a calculator, denominational orders of adding mechanism including sector gears, manually operable keys for depressing said sector gears in a setting operation, an actuating spring for each sector gear operative to return the gear from set position whereby to impart an adding movement to the associated adding mechanism, a trans-ordinal rockshaft having a series of radial arms, said springs being attached to one end of the sectors and at their opposite ends to said arms, means operable to tension said springs and to maintain them normally in tensioned state including a toggle lock, and means for breaking said toggle lock to temporarily relieve the tension of said springs.

18. In a calculator, denominational orders of adding mechanism each including a sector gear, keys for actuating the gears in a digital controlling operation, an actuating spring for each sector gear to operate the gear in its return stroke and thereby impart an adding movement to the associated adding mechanism, a trans-ordinal rockshaft having a series of radial arms, said springs being attached at one end to the sectors and at their opposite ends to said arms, means operative to rock said shaft to a position to tension said springs and to maintain them normally in tensioned state including a toggle lock, means for making up and breaking said toggle lock to tension and to relieve the tenson of said springs, auxiliary actuating mechanism including means associated with each of said denominational orders of adding mechanism and adapted to operate the sector gears en masse, said auxiliary actuating mechanism being normally locked against action, means operable to release said auxiliary actuating mechanism for action, a series of locking devices including one for each order of adding mechanism effective for locking the adding mechanisms against an adding movement during their en masse actuation by the auxiliary actuating mechanism, said series of locking devices being normally inoperative and being rendered operative with operation of said releasing means, and means for unlocking said locking devices to permit said actuating springs to operate the gears in their return strokes.

19. In a calculator, denominational orders of adding mechanism including sector gears and keys for actuating them in the setting operation, an actuating spring for each sector gear for operating the same in its return or adding stroke, a trans-ordinal rockshaft having a plurality of radially extending arms, said springs being attached at one end to the sectors and at their opposite ends to the arms of said shaft, a toggle lock acting on said shaft to tension said springs and to maintain them normally in a tensioned state, means for breaking said toggle lock to relieve the tension to said springs, auxiliary mechanism operable independently of the keys and adapted to operate the sector gears en masse, said auxiliary mechanism being normally locked against action, manipulative means for releasing said auxiliary mechanism for action, a series of locking devices one for each order of adding mechanism conditioned by said manipulative means to lock the adding mechanism against an adding movement following any pre-adding movement they may receive from key action or en masse from the auxiliary actuating mechanism, said auxiliary mechanism having a manipulative device operative to supply power to operate the sector gears and to return the auxiliary mechanism to its normal position and means for unlocking the locking devices to permit said actuating springs to operate the gears in their return strokes.

20. In a calculator, denominational orders of adding mechanism including sector gears and keys for actuating them in each order in a setting operation, an actuating spring for each sector gear to operate the gear in its return or adding stroke, a trans-ordinal rockshaft having a plurality of radially extending arms, said springs being attached at one end to the sector gears and at their opposite ends to the arms of said rockshaft, means including a toggle lock acting on said shaft to tension said springs and to maintain them normally in a tensioned state, means for breaking said toggle lock to relieve the tension of said springs, auxiliary mechanism operable independently of the keys adapted to break said toggle lock and to operate said sector gears en masse, said auxiliary mechanism being normally locked against action, manipulative means operable to release the auxiliary mechanism for action, a series of locking devices, one for each order of adding mechanism conditioned by said manipulative means to lock the adding mechanisms against an adding movement after any pre-adding movement they may receive from key action or en masse from the auxiliary mechanism, said auxiliary mechanism having a manipulative device operative to supply power to depress the sector gears and then to return the auxiliary mechanism and the toggle lock to normal position after making its initial power-giving movement, and a toggle lock connection between said manipulative device and said auxiliary mechanism acting to operate the auxiliary mechanism in its sector gear operating action, said connection being broken at the end of said action to permit adding action of the sector gears under the influence of their actuating springs and to permit the return of the auxiliary mechanism.

21. In a calculator, denominational orders of adding mechanism including sector gears and keys for actuating them in each order in a setting operation, an actuating spring for each sector gear to operate the gear in its return or adding stroke, a trans-ordinal rockshaft having a plurality of radially extending arms, said springs being attached at one end to the sector gears and at their opposite ends to the arms of said rockshaft, means including a toggle lock acting on said shaft to tension said spring and maintain them normally in a tensioned state, means for breaking said toggle lock to relieve the tension of said springs, auxiliary mechanism operable independently of the keys adapted to operate the sector gears en masse, said auxiliary mechanism being normally locked against action, manipulative means operable to release the auxiliary mechanism to condition it for action, a series of locking devices, one for each order of adding mechanism conditioned by said manipulative means to lock the adding mechanisms against an adding movement after any pre-adding movement they may receive from key action or en masse from the auxiliary mechanism, said auxiliary mechanism having a manipulative device operative to supply power to depress the sector gears and to return the auxiliary mechanism to normal position after making its initial or power-giving movement, a toggle lock connection between said manipulative device and said auxiliary mechanism acting to operate the auxiliary mechanism in its sector gear depressing action, said connection being broken at the end of said action to prevent interference with the adding action of the sector gears as the auxiliary mechanism returns to normal with the gears, and means for releasing said locking devices and for making up the sector gear spring tensioning toggle lock whereby to return all of the sector gears to their normal positions.

22. In a key-driven calculator, in combination, denominational orders of accumulator mechanism, a set of manually operable keys for each order, pivotally supported sector gears adapted to be rocked to operated positions by said keys, springs for returning the sector gears to normal position for operating the accumulator mechanism, means for temporarily latching operated sector gears in operated positions, a lever for each order operable to rock the sector gear thereof to operated position independently of the keys, a manipulative device for operating said levers, said levers being yieldably coupled with said device so as to avoid disturbing sectors previously operated by the keys and means operated with the manipulative device for releasing the latching means.

23. In a key-driven calculating machine, in combination, a plurality of denominational orders of accumulator mechanisms, a row of digital keys for each order, a pivoted member for each order extending along the rows of keys for engagement thereby and adapted to be rocked about its pivot upon depression of one of said keys, a sector gear in each order actuated by the pivoted member for registering in the accumulator mechanism a value corresponding to that of the key depressed, means for releasably holding the sector gears in actuated position, a lever for each order pivoted to swing into engagement with the pivoted member of that order, a manually operable rockshaft, and means providing operative connections between said shaft and said levers whereby the levers may be actuated to rock said members to register predetermined values in the accumulator mechanisms, said connections being yieldable to permit the levers to remain unoperated in orders in which the members have been actuated by a key in that order, and means operated with operation of the rockshaft to release said holding means.

24. In a multiple order key-driven calculating machine having a registering accumulator for each order, an actuating mechanism for each accumulator comprising a series of uni-marked keys and a motion-transmitting means interposed between said series of keys and the accumulator and including a compound lever having a main section with a primary fulcrum and an auxiliary section pivoted to the main section, means disengageably connecting said sections together for operation in unison, and means operative to establish a secondary fulcrum for the auxiliary section and as an incident thereto to disconnect the two sections for relative movement, said lever being operative when said primary fulcrum is effective to transmit to the accumulator the marked value of the key depressed and being operative when said secondary fulcrum is effective to transmit to the accumulator a value different from that of the key depressed without substantial change in the extent of key movement.

25. In a multiple order key-driven calculating machine having a registering accumulator for each order, actuating mechanism for each order of the accumulator comprising a series of manually operable uni-marked keys and motion-transmitting means including a compound lever having a main section operatively associated with the accumulator and having a primary fulcrum and an auxiliary section pivoted to the main section and arranged for coaction with said keys, means disengageably connecting said sections together for operation in unison, and means operative to establish a secondary fulcrum for the auxiliary section and as an incident thereto to disconnect the two sections for relative movement, said lever being variably displaceable by said keys in one order of progression when said primary fulcrum is effective and in the reverse order of progression when said auxiliary fulcrum is effective.

26. In a calculating machine having an accumulator, key-actuated means for operating said accumulator including a row of manually depressible digit keys numbered from 1 to 9, a lever extending generally parallel to said row of keys for actuation by any one of the keys, said lever having one fulcrum located adjacent one end of the row of keys for transmitting the key movements to the accumulator to add values in one order of progression, and another fulcrum located adjacent the other end of the row of keys for transmitting the key movements to the accumulator so as to add values in the reverse order of progression, and means for rendering either of the fulcrums effective and the companion fulcrum ineffective.

27. In a key-driven calculator, an accumulator mechanism with automatic carrying mechanism for each registering unit to automatically carry the tens from a lower to a higher unit, digitally controlled actuating mechanism for each registering unit, an ordinal set of uni-marked keys forming a part of each of said actuating mechanisms to operate them, said actuating mechanism including a compound lever operable about a plurality of selectable fulcrums, said lever being adapted when operating about one fulcrum to transmit to the accumulator mechanism the marked value of the keys in positive forms of calculation and said lever being adapted when operating about a second fulcrum to transmit to said accumulator mechanism the complement of the marked value of the keys in negative forms of calculation by the complemental method and means in the form of manually set devices for selecting the fulcrum about which the lever will operate.

28. In a key-driven calculator, a series of denominational orders of accumulator mechanisms including wheels for registering the totals, key-driven actuating mechanism for operating each denominational order of the said accumulator mechanism in positive calculation including a keyboard having a set of digitally uni-marked keys for each order, means for conditioning the actuating mechanism to operate said orders of accumulator mechanisms in negative calculation by the complemental method, the key control of the actuating mechanism taking place on the down key stroke and the adding action of said actuating mechanism taking place on the return stroke, springs in which power is stored by the down key strokes for actuating the said actuating mechanisms on their up key strokes, means for intercepting the up stroke adding action when the machine is set for subtraction, means for operating the actuating mechanisms in orders which have not been intercepted so that they will add nine in each order except the units order, said last mentioned means acting to operate the actuating mechanism of the units order to add ten, and release means actuated with the operating means for releasing the intercepting means.

29. In a key-driven calculator, a series of denominational orders of accumulator mechanisms including wheels for registering the totals, key-driven actuating mechanism for operating each denominational order of said accumulator mechanism in positive calculation including a keyboard having a set of digitally uni-marked keys for each order, means for conditioning said actuating mechanism to operate the said orders of accumulator mechanisms in negative actuation by the complemental method, the key control of the actuating mechanism taking place on the down key stroke and the adding action of the said actuating mechanism taking place on the return stroke, springs in which power is stored by the down key strokes for actuating the said actuating mechanisms on the up key strokes, means for intercepting the up stroke adding action when the machine is set for subtraction, and auxiliary means whereby any remaining orders of the actuating mechanism, which have not been set in setting up the subtrahend, may be universally depressed to a degree that they will add ten in the units order and nine in all other orders, said last mentioned means being further operative to release all of said intercepting means whereby said actuating mechanisms effect their adding actions simultaneously.

30. In a key-driven calculator, a series of denominational orders of accumulator mechanisms including wheels for registering the totals, key-driven actuating mechanism for operating each denominational order of said accumulator mechanisms in positive calculation including a keyboard having a set of digitally uni-marked keys for each order, means for conditioning said actuating mechanism to operate said orders of accumulator mechanisms in negative calculation by the complemental method, the key control of the actuating mechanism taking place on the down key stroke and the adding action of the said actuating mechanism taking place on the return stroke, springs in which power is stored by the down key strokes for operating said actuating mechanism on the up key strokes, means for intercepting the up stroke adding action when the machine is conditioned for subtraction, auxiliary means for operating the actuating mechanism in orders which have not been intercepted so that they will add ten in the units order and nine in all other orders, manipulative means for said auxiliary means effective when operated in subtraction to release all of the orders at the end of its manipulative action leaving the actuating mechanism free of said intercepting means to operate under the power in the springs, means for automatically resetting the machine for positive calculation after the completion of a negative calculation, means for locking said manipulative means, and means operated upon setting the machine for subtraction to unlock the manipulative means.

31. In a key-driven calculator, having a multiple order accumulator mechanism a digitally uni-marked keyboard and means for transmitting the movements of the keys to said mechanism, means for conditioning the movement transmitting means so that it may perform positive forms of calculation by operation according to the key marking, other means for conditioning said movement transmitting means for negative forms of calculation by operation according to the same key marking; manually operated auxiliary means for operating the accumulator mechanism, when the movement transmitting means is conditioned for subtraction, in all orders in which a key was not depressed in setting a subtrahend up on the keys to add nines in all such orders except the units order and, if no key was depressed in the units order in setting up said subtrahend, to add ten therein, means for maintaining said auxiliary means normally locked against use, means for unlocking the auxiliary means and for simultaneously conditioning the movement transmitting means for subtraction, and means for relocking the auxiliary means upon its return to normal position after an operation.

32. In a key-driven calculator, a plurality of denominational orders of key-driven adding mechanisms each including a lever having a plurality of alternately effective fulcrums, said levers being effective upon depression of a key to impart the marked value or the complement of the marked value of the key to the adding mechanism according to which of the fulcrums is effective; dual stop devices connected to the adding mechanisms and coacting with the keys and operating to control the degree of adding movement imparted to the adding mechanism by determining the permissive movement of each key according to whichever fulcrum is effective, manipulative means for presetting and conditioning said fulcrums and the dual digital control devices for addition and multiplication, another manipulative means for presetting and conditioning said fulcrums and dual digital control devices for subtraction, a third manipulative means for presetting and conditioning said fulcrums and dual digital control devices for division, means operating only when the calculator is set for subtraction for locking the keys in depressed position, and manually operable auxiliary means operative when the calculator is set for subtraction for operating the adding mechanism in all orders in which a key has been depressed in accordance with the key marking and simultaneously operating the adding mechanism in all orders in which a key has not been depressed to add nines in all such orders except the units order and to add ten in the units order.

33. In a key-driven calculator having a digitally uni-marked keyboard, a registering accumulator and key-driven mechanism therefor, means for conditioning the key-driven mechanism to transmit to the accumulator the marked value of each key upon depression thereof in positive forms of calculation, means for conditioning said key-driven mechanism to transmit to the accumulator the complement of the marked value of each key upon depression thereof in negative forms of calculation by the complemental method, a first stop bar connected to the key-driven mechanism coacting with the keys and operating to control the degree of adding movement imparted by the key-driven mechanism by determining the permissible degree of depression of each key in positive forms of calculation, a second stop bar connected to the key-driven mechanism and coacting with the keys and operating to control the degree of adding movement imparted by the key-driven mechanism by determining the permissible degree of depression of each key in negative forms of calculation, means on the second stop bar adapted to engage the keys at the end of a down key stroke to lock the key in depressed position, and manually operable auxiliary means for operating the key-driven mechanism in all orders in which a key has been locked in depressed position in accordance with the marking of the depressed key and simultaneously operating the key-driven mechanism in all orders in which a key has not been locked in depressed position to add nines in all such orders except the units order and to add ten in the units order.

34. In a key-driven calculator having denominational orders of adding mechanism, each including a digitally uni-marked set of keys and a lever adapted to be fulcrumed at different points thereof to give varying degrees of adding action from depression of the same key; a dual stop mechanism including two stop devices one operating when one of the fulcrums is active and the other operating when the other fulcrum is active to gauge the varying degrees of action of each key; and means operable manually to determine which of the dual stop devices of the dual stop mechanism and which of the fulcrums is to control the denominational orders of adding mechanism in positive and negative forms of calculation, respectively.

35. In a key-driven calculating machine, denominational orders of accumulator mechanisms, each order including manually operable keys and sector gears as the prime movers of the accumulator mechanisms, springs for actuating the said sectors on a return or adding stroke after they have been actuated in a pre-adding movement by the keys; a tensioning device for said springs universal to all orders, toggle mechanism operative to set said device in a position to tension all of said springs or to relieve the tension so that the sector gears may be free to move en masse, and an auxiliary lever-operated means universal to all orders of accumulator mechanisms for manually operating the sector gears en masse independent of the keys and for operating said toggle mechanism.

36. In a key-driven calculator, denominational orders of adding mechanisms including accumulator mechanisms inter-ordinally connected by automatic carrying mechanisms, manually operable keys and sector gears for actuating the accumulator mechanisms, springs tensioned by movement of the sector gears in response to key depression and adapted to actuate the sector gears in their return and adding movement in combination with means for moving the sector gears en masse independent of said keys, a manipulative device settable to condition said independent sector gear moving means for operation, means for operating the manipulative device, latching devices settable by said manipulative device to prevent an adding movement of said sector gears and means operated with operation of said independent sector gear moving means for releasing said latching devices to allow said sector gears to return under the action of their springs whereby to add the amounts set thereby to the accumulator mechanism.

37. In a key-driven calculator, denominational orders of adding mechanisms including accumulator mechanisms inter-ordinally connected by automatic carrying means, manually operable keys and sector gears, for actuating the accumulator mechanisms, springs tensioned by movement of the sector gears in response to key depression and adapted to actuate the sector gears in their return and adding movement in combination with means for moving the sector gears en masse independent of the keys, a manipulative device settable to condition said independent sector gear moving means for operation, means for operating the manipulative device, latching devices settable by said manipulative device to prevent an adding movement of the said sector gears, means operated with operation of said independent sector gear moving means for releasing said latching devices to allow the sector gears to return under the action of their springs whereby to add the amount set thereby to the accumulator mechanism, a hand lever connected with and operable to supply power to said independent sector gear moving means, means for locking said independent sector gear moving means and said hand lever releasable by said manipulative device, and means for breaking the connection between said independent sector gear moving means and said hand lever to prevent interference by the operator with the adding movement of the sector gears after they have been moved in a pre-adding movement.

38. In a key-driven calculating machine, in combination, accumulator mechanism, an ordinal column of uni-marked keys, means operable by said keys for actuating said accumulator mechanism, said actuating means including a pivoted sector gear adapted to be rocked through progressively varying arcs to register values in the accumulator mechanism, a fulcrumed bell crank having one arm extending along the column of keys and the other arm operatively connected with said sector gear, an elongated lever pivotally supported intermediate its ends on said one arm of the bell crank and extending along the column of keys for engagement thereby as the keys are depressed, a lug on said one arm extending over one end of said lever to limit the degree of movement of the lever relative to the arm in one direction, a dog carried by said bell crank and adapted to be moved between an inactive position and an active position in which it is disposed in blocking relation to said one end of the lever to limit the degree of movement of the lever relative to the arm in the other direction, a second dog carried by said sector gear adapted to be moved between an inactive and active position in which it is engageable with the other end of the lever to releasably latch the lever to the sector gear, and means including a link connecting said dogs for moving either of said dogs to its active position and simultaneously moving the other dog to its inactive position.

39. In a key-driven calculator, denominational orders of adding mechanism, actuating mechanism for each order including a lever having variably operating fulcrums and a set of digit keys for operating the same, said lever being pre-settable to cooperate with a first fulcrum to impart to said adding mechanism the amount of the key markings of the keys depressed as in addition, and said lever being pre-settable to cooperate with a second fulcrum to impart to said adding mechanism the complement of the key markings as in subtraction or division by the complemental method.

40. In a key-driven calculating machine, denominations of ordinal digitally uni-marked sets of keys, an accumulator mechanism for each ordinal set of keys, an actuating mechanism of which said keys form a part for operating said accumulator mechanisms, each actuating mechanism including a motion transmitting means for transmitting the motion of a key to the associated accumulator mechanism, a plurality of selectively operable leverage systems forming a part of said motion transmitting means, one of said leverage systems being adapted to transmit to the accumulator mechanism the marked value of the key and another of said leverage systems being adapted to transmit to the accumulator mechanism the complement of the marked keys when used in negative calculation by the complemental method, and selecting means for rendering either of said leverage systems operable.

41. In a key-driven calculator, denominational orders of registering accumulator mechanisms and automatic carrying mechanisms for carrying of tens from a lower to a higher order, a set of digitally uni-marked keys for each order and a leverage system operated by the keys and including a plurality of selectively operable fulcrums for operating the accumulator mechanism, said leverage system being adapted when operating about one fulcrum to add the marked value of the keys to the accumulator mechanism and when operating about the other fulcrum to add the complement of the marked value to the accumulator mechanism, a dual digital control coacting with the keys and connected to the leverage system to control the amount of movement of the leverage system by controlling the permissive movement of the keys, one of said digital controls permitting a different degree of movement of the keys than the other digital control, means for selecting the fulcrum about which the leverage system will operate, said selecting means operating to render one of the digital controls operative and the other inoperative when the leverage system is operating about one fulcrum and said selecting means operating to reverse the operativeness of the digital controls when the leverage system is operating about the other fulcrum.

42. In a key-driven calculator, denominational orders of digitally uni-marked keys, adding mechanism including a registering accumulator mechanism for each order and automatic carrying mechanism for carrying of the tens from a lower to a higher order, manually operative means for conditioning the calculator for positive and for negative calculation, means for transmitting the movement of the keys to said accumulator mechanism including a differential actuator adapted to give varying degrees of adding action to the adding mechanism upon depression of the same key depending upon the conditioning of the calculator for positive and for negative calculation, a dual digital control coacting with the keys and connected to the differential actuator and controlling the movement of the actuator by controlling the permissive movement of the keys in each order, whereby the same key may add its marked value to the accumulator mechanism when the machine is conditioned for positive calculation and the complement of its marked value when the machine is conditioned for negative calculation by the complemental method, other means auxiliary to key movement for manually operating the adding mechanism and serving to supply power simultaneously to all orders of the adding mechanism in which a key was not depressed in setting up a subtrahend, and means for locking said auxiliary operating means against manual operation except when the machine is conditioned for subtraction and for relocking the same after each operation thereof in a subtraction operation.

JOSEPH A. V. TURCK.

REFERENCES CITED

The following references are of record in the file of this patent:

UNITED STATES PATENTS

| Number | Name | Date |
|---|---|---|
| 392,837 | Webb | Nov. 13, 1888 |
| 503,986 | Richmond | Aug. 29, 1893 |
| 1,028,135 | Rein | June 4, 1912 |
| 1,049,929 | Sims | Jan. 7, 1913 |
| 1,136,321 | Ellis | Apr. 20, 1915 |
| 1,189,288 | Rechnitzer | July 4, 1916 |
| 1,342,459 | Pasinski | June 8, 1920 |
| 1,345,781 | Hurley | July 6, 1920 |
| 1,433,737 | Morgan | Oct. 31, 1922 |
| 1,527,407 | Harmsen | Feb. 24, 1925 |
| 1,532,832 | Mays | Apr. 7, 1925 |
| 2,240,797 | Pasinski | May 6, 1941 |
| 2,356,714 | Webb | Aug. 22, 1944 |
| 2,410,823 | Laiho | Nov. 12, 1946 |

FOREIGN PATENTS

| Number | Country | Date |
|---|---|---|
| 174,207 | Canada | Dec. 26, 1916 |